(12) United States Patent
Inoue

(10) Patent No.: US 8,263,172 B2
(45) Date of Patent: *Sep. 11, 2012

(54) METHOD FOR PRODUCING OPTICAL ELEMENT HAVING MULTI-LAYERED FILM

(75) Inventor: Yasuaki Inoue, Osaka (JP)

(73) Assignee: Nalux Co., Ltd., Osaka (JP)

( * ) Notice: Subject to any disclaimer, the term of this patent is extended or adjusted under 35 U.S.C. 154(b) by 445 days.

This patent is subject to a terminal disclaimer.

(21) Appl. No.: 12/379,519

(22) Filed: Feb. 24, 2009

(65) Prior Publication Data

US 2009/0252862 A1    Oct. 8, 2009

Related U.S. Application Data

(63) Continuation-in-part of application No. PCT/JP2007/066483, filed on Aug. 24, 2007.

(30) Foreign Application Priority Data

Aug. 25, 2006  (WO) ................. PCT/JP2006/316762
Jun. 20, 2007  (JP) ................................. 2007-162754

(51) Int. Cl.
C23C 16/52    (2006.01)
B05D 5/06     (2006.01)
C23C 16/00    (2006.01)
H05H 1/24     (2006.01)

(52) U.S. Cl. .......... 427/8; 427/162; 427/248.1; 427/569

(58) Field of Classification Search .......... 427/8, 248.1, 427/162, 569
See application file for complete search history.

(56) References Cited

U.S. PATENT DOCUMENTS

| 4,895,767 | A | 1/1990 | Mori et al. | |
| 2003/0124392 | A1* | 7/2003 | Bright | ........................ 428/698 |
| 2003/0203210 | A1 | 10/2003 | Graff et al. | |
| 2003/0215575 | A1* | 11/2003 | Martin et al. | .............. 427/407.1 |
| 2005/0180010 | A1* | 8/2005 | Mukaiyama et al. | ......... 359/497 |
| 2008/0192349 | A1 | 8/2008 | Inoue | |

(Continued)

FOREIGN PATENT DOCUMENTS

JP     07-198926    8/1995

(Continued)

Primary Examiner — Kelly M Gambetta
(74) Attorney, Agent, or Firm — Squire Sanders (US) LLP

(57) ABSTRACT

A method for producing an optical element, in which a multi-layered film is provided on a plastic substrate, having a resistance against lights in a wavelength range of 300 nm to 450 nm, is provided. The method for producing the optical element according to the invention, is an method for producing an optical element having a multi-layered film in which a layer made of a low-refractive-index material and a layer made of a high-refractive-index material are alternately formed on a plastic substrate, the optical element being used for light in a wavelength range of 300 nm to 450 nm. The optical element producing method includes the steps of forming alternately the layer made of the low-refractive-index material and the layer made of the high-refractive-index material on the plastic substrate to produce the optical element while plasma or ionized gas is generated by a generation source in forming at least the layer made of the high-refractive-index material under a predetermined producing conditions; measuring an oxygen permeability coefficient of the produced optical element; and changing one of an output of the generation source, an ambient gas pressure in forming the layer made of the low-refractive-index material, and an ambient gas pressure in forming the layer made of the high-refractive-index material among the predetermined producing conditions when the oxygen permeability coefficient of the produced optical element is more than 30 $cm^3 \cdot mm/(m^2 \cdot 24 \, hr \cdot atm)$.

9 Claims, 23 Drawing Sheets

U.S. PATENT DOCUMENTS

| | | |
|---|---|---|
| 6,232,407 B1 | 5/2001 | Hashidzume et al. |
| 2003/0017316 A1 | 1/2003 | Pfaff et al. |

FOREIGN PATENT DOCUMENTS

| | | |
|---|---|---|
| JP | 11-030703 | 2/1999 |
| JP | 11-171596 | 6/1999 |
| JP | 11-326634 | 11/1999 |
| JP | 2001198710 | 7/2001 |
| JP | 2002-055207 | 2/2002 |
| JP | 2002-071903 | 3/2002 |
| JP | 2003-098308 | 4/2003 |
| JP | 2003248102 | 9/2003 |
| JP | 2005-076095 | 3/2005 |

\* cited by examiner

METHOD FOR PRODUCING OPTICAL ELEMENT HAVING MULTI-LAYERED FILM

TECHNICAL FIELD

The present invention relates to a method for producing an optical element, in which a multi-layered film is provided on a substrate, having a resistance against lights in a wavelength range of 300 nm to 450 nm. In particular, the present invention relates to a method for producing an optical element with a multi-layered film which can be used in a short-wavelength, high-power (30 mW/mm$^2$ or more) blue laser.

BACKGROUND ART

A short-wavelength, high-power blue laser is expected to be more widely used in an optical pickup or the like. In general, plastic is easily damaged by a laser. Therefore, some optical parts of devices using a short-wavelength, high-power blue laser consist of glass instead of plastic to avoid damage by a laser. For this reason, the prices of devices are relatively high. The relatively high prices are a hurdle to be overcome to enlarge the market of the devices.

At present, plastic materials which can cope with a relatively-low-power blue laser are supplied from various material manufacturers. However, there is no plastic material which can withstand a high-power blue laser.

On the other hand, an antireflection film is frequently formed on surfaces of plastic lenses used in video camcorders, still cameras, glasses, and the like. Such an antireflection film consists of a multi-layered film obtained by alternatively forming low-refractive-index layers and high-refractive-index layers. The multi-layered film is described in Japanese Patent Applications Laid-Open Nos. 11-30703, 11-171596, 11-326634, 2002-71903, 2003-98308, 2003-248102, and the like. However, a conventional antireflection film cannot prevent a damaged caused by a high-power blue laser or ultraviolet light.

Generally an optical element in which a multi-layered film is provided on a plastic substrate cannot be used for light having a wavelength shorten than 300 nm because a transmittance of the light for the plastic substrate is remarkably lowered. On the other hand, the optical element can be used without any difficulty for lights having wavelengths longer than 450 nm because of little deterioration (damage) of the plastic substrate caused by the light. Therefore, there is generated deterioration (damage) of the plastic substrate of the optical element in which the multi-layered film is provided on the plastic substrate becomes troublesome for lights in a wavelength range of 300 nm to 450 nm.

Under the background art mentioned above, there is a need of a method for producing an optical element, in which a multi-layered film is provided on a plastic substrate, having a resistance against lights in a wavelength range of 300 nm to 450 nm.

DISCLOSURE OF THE INVENTION

A method for producing the optical element according to the invention, is a method for producing an optical element having a multi-layered film in which a layer made of a low-refractive-index material and a layer made of a high-refractive-index material are alternately formed on a plastic substrate, the optical element being used for light in a wavelength range of 300 nm to 450 nm. The optical element producing method includes the steps of forming alternately the layer made of the low-refractive-index material and the layer made of the high-refractive-index material on the plastic substrate to produce the optical element while plasma or ionized gas is generated by a generation source in forming at least the layer made of the high-refractive-index material under a predetermined producing conditions; measuring an oxygen permeability coefficient of the produced optical element; and changing one of an output of the generation source, an ambient gas pressure in forming the layer made of the low-refractive-index material, and an ambient gas pressure in forming the layer made of the high-refractive-index material among the predetermined producing conditions when the oxygen permeability coefficient of the produced optical element is more than 30 cm$^3$·mm/(m$^{20}$·24 hr·atm).

In the optical element producing method according to an embodiment of the invention, an ion plating method is adopted, and the optical element producing method includes the steps of forming alternately the layer made of the low-refractive-index material and the layer made of the high-refractive-index material on the plastic substrate to produce the optical element while the plasma is generated by a high-frequency power supply in forming at least the layer made of the high-refractive-index material under the predetermined producing conditions; measuring the oxygen permeability coefficient of the produced optical element; and changing one of an output of the high-frequency power supply, the ambient gas pressure in forming the layer made of the low-refractive-index material, and the ambient gas pressure in forming the layer made of the high-refractive-index material among the predetermined producing conditions when the oxygen permeability coefficient of the produced optical element is more than 30 cm$^3$·mm/(m$^{20}$·24 hr·atm).

In the optical element producing method according to an embodiment of the invention, a sputtering method is adopted, and the optical element producing method includes the steps of forming alternately the layer made of the low-refractive-index material and the layer made of the high-refractive-index material on the plastic substrate to produce the optical element while oxygen is supplied to generate oxygen plasma by an output of an oxidation source in a oxidation region; measuring the oxygen permeability coefficient of the produced optical element; and changing an output of the oxidation source when the oxygen permeability coefficient of the produced optical element is more than 30 cm$^3$·mm/(m$^{20}$·24 hr·atm).

In the optical element producing method according to an embodiment of the invention, an ion beam assist deposition method is adopted, and the optical element producing method includes the steps of forming alternately the layer made of the low-refractive-index material and the layer made of the high-refractive-index material to produce the optical element while an ion gun ionizes ambient gas to supply ionized gas onto the plastic substrate under the predetermined producing conditions; measuring the oxygen permeability coefficient of the produced optical element; and changing one of an output of the ion gun, the ambient gas pressure in forming the layer made of the low-refractive-index material, and the ambient gas pressure in forming the layer made of the high-refractive-index material among the predetermined producing conditions when the oxygen permeability coefficient of the produced optical element is more than 30 cm$^3$·mm/(m$^2$·24 hr·atm).

DETAILED DESCRIPTION OF THE INVENTION

Figure 1:
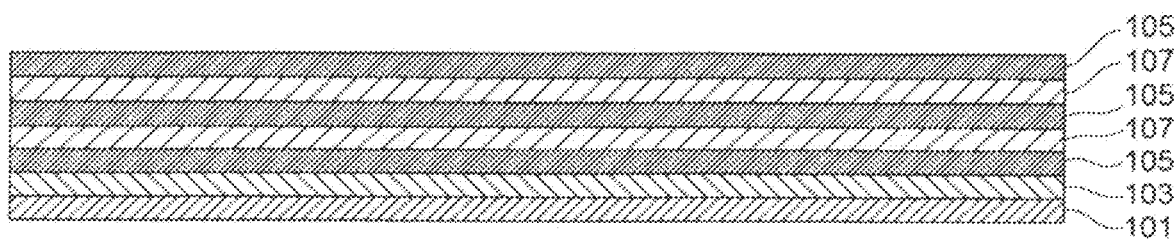
FIG. 1 is a diagram showing a configuration of an optical element having a laser damage suppression film according to a first embodiment of the present invention.

FIG. 1 is a diagram showing a configuration of an optical element having a laser damage suppression film according to a first embodiment of the present invention. In FIG. 1, a layer 103 consisting of silicon monoxide (SiO) is formed on a substrate 101 consisting of a blue-laser-coping plastic material. The layer 103 consisting of silicon monoxide functions to improve adhesiveness between the substrate 101 consisting of a plastic material and a layer formed thereon. On the layer 103 consisting of silicon monoxide, layers 105 consisting of a low-refractive-index material and layers 107 consisting of a high-refractive-index material are alternately formed. In the embodiment, three layers 105 consisting of low-refractive-index material and two layers 107 consisting of high-refractive-index material are formed.

In this case, the blue-laser-coping plastic material is an olefin-based material. More specifically, the material is a thermoplastic transparent resin cycloolefin polymer having an antioxidant function.

The layer 103 consisting of silicon monoxide is formed on the substrate 101 by a vacuum deposition method. In the vacuum deposition method, a material (in this case, silicon monoxide) to be formed as a thin film, is heated by a resistance wire or by electron beam irradiation to evaporate the material. The evaporated material is caused to attach to (deposited on) the substrate to form a thin film. The thickness of the layer 103 consisting of silicon monoxide is about several hundred nanometers.

The low-refractive-index material is silicon dioxide ($SiO_2$) in this embodiment. The refractive index of the layer 105 consisting of silicon dioxide is 1.4 to 1.5. The layer 105 consisting of silicon dioxide is formed by the vacuum deposition method. The thickness of the layer 105 consisting of silicon dioxide is from several ten nanometers to several hundred nanometers.

Aluminum fluoride ($AlF_3$), magnesium fluoride ($MgF_2$), and a composite oxide including silicon dioxide ($SiO_2$) can also be used as the low-refractive-index material.

The high-refractive-index material is obtained by adding a slight amount of titanium dioxide ($TiO_2$) to tantalum pentoxide ($Ta_2O_5$) in the embodiment. The refractive index of the layer 107 consisting mainly of tantalum pentoxide is 2.0 to 2.3. The layer 107 consisting mainly of tantalum pentoxide is formed by an ion plating method. The ion plating method is a method for ionizing some evaporated particles by using gas plasma and depositing them on a substrate biased to a negative high voltage. Since the material to be deposited is accelerated by an electric field and attached to the substrate, a film having high adherence is obtained. A thickness of the layer 107 consisting mainly of tantalum pentoxide is several ten nanometers to several hundred nanometers.

As the material of the layer 107, $Ta_xO_y$ where values of x and y are properly determined can be used.

As the high-refractive-index material, a titanium-oxide-based material can also be used.

409 on a resistor heating board 410 and the base 408. As a result, a thin film having high purity, high density, and high adhesiveness can be formed on the surface of the base 408.

An electron gun 4101 for electron beam heating is installed under a crucible including the resistor heating board 410.

An outline of a film forming method will be shown in the following table.

TABLE 1

| | Film Configuration | $O_2$ Introduction Pressure Setting (Pa) | Film Forming Rate Setting | Film Thickness (measure) | Deposition Time (minute) (measure) | Evaporation Source | Plasma Generation |
|---|---|---|---|---|---|---|---|
| First Layer | SiO | 2.80E−02 | 3.0 Å/S | 2440 Å | 13.5 | RH | None |
| Second Layer | $SiO_2$ | 6.00E−03 | 10.0 Å/S | 1650 Å | 2.8 | EB | None |
| Third Layer | Tantalum-oxide-based material | 2.00E−02 | 3.0 Å/S | 125 Å | 1.7 | EB | Present |
| Fourth Layer | $SiO_2$ | 6.00E−03 | 10.0 Å/S | 300 Å | 0.6 | EB | None |
| Fifth Layer | Tantalum-oxide-based material | 2.00E−02 | 3.0 Å/S | 330 Å | 1.8 | EB | Present |
| Sixth Layer | $SiO_2$ | 6.00E−03 | 10.0 Å/S | 630 Å | 2 | EB | None |

Layers having different refractive indexes may be alternately formed to constitute a large number of reflective surfaces. External lights reflected by the large number of reflective surfaces may interfere with one another and may be canceled out to obtain an antireflection effect. Optical path lengths (=layer thicknesses and refractive indexes) of the layers may be different from one another to generate interference in a wide wavelength range, so that an antireflection effect can be obtained in a wide wavelength range of external lights. In this manner, the multi-layered film may include not only the laser damage suppression function but also the antireflection function.

Figure 4:
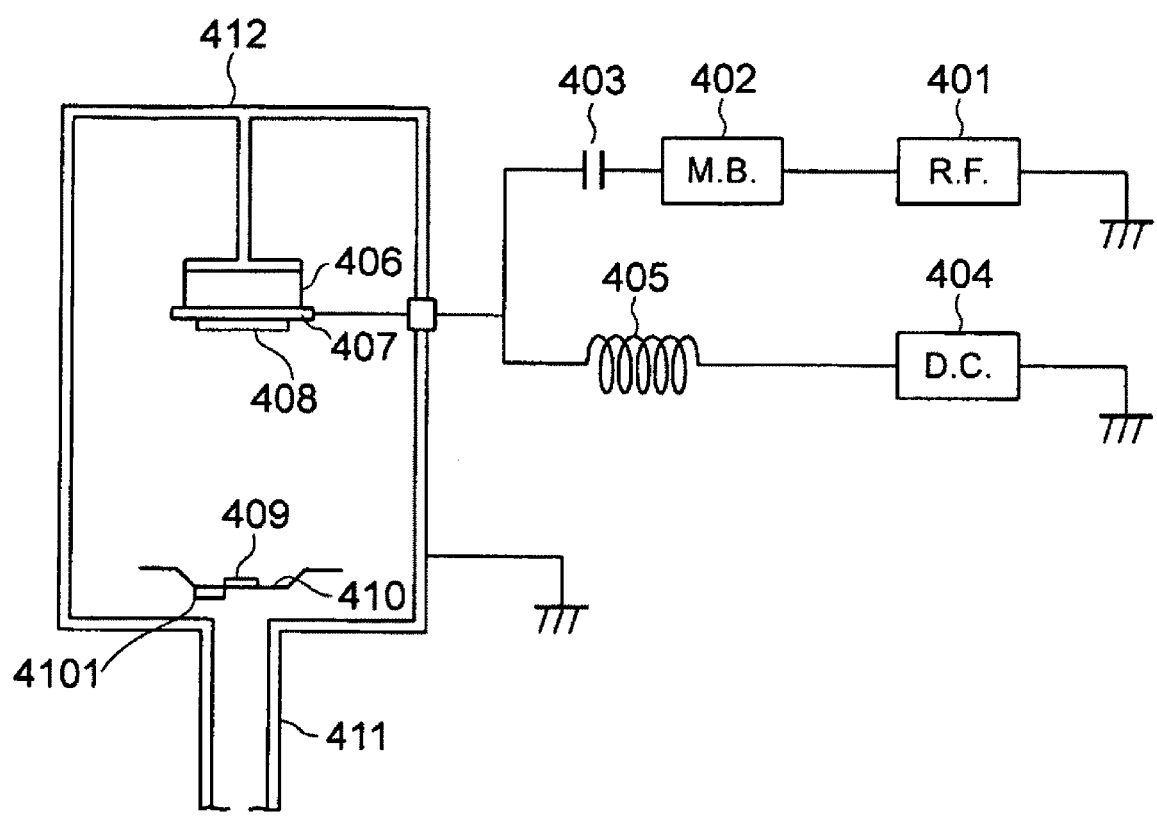
FIG. 4 is a diagram showing a configuration of an ion plating apparatus to practice an ion plating method.

FIG. 4 is a diagram showing a configuration of an ion plating apparatus to practice the ion plating method. The ion plating apparatus is disclosed in Japanese Patent Application Laid-Open No. 1-48347, for example. In a vacuum chamber 412, a base holder 407 consisting of a conductive material and supporting a base 408, and a support member consisting of a conductive material and supporting the base holder via an insulating material, constitute a capacitor 406.

A high-frequency power supply 401 is connected between the vacuum chamber 412 and the base holder 407 via a blocking capacitor 403 and a matching box 402 to supply a high-frequency voltage. A DC power supply 404 is connected between the vacuum chamber 412 and the base holder 407 via a choke coil 405 such that the base holder 407 is on a negative side to supply a DC bias voltage. An output from the high-frequency power supply 401 is 500 W, and a voltage of the DC power supply 404 is 100 V.

An output from the high-frequency power supply 401 preferably ranges from 300 to 900 W. In this range, an output value can be adjusted to improve the denseness of the film.

The capacitor 406 operates together with the matching box 402 connected to the high-frequency power supply 401 which supplies a high-frequency voltage into the vacuum chamber 412 to perform matching, and thus a stable electric field can be made and maintained between a material to be evaporated In Table 1, the tantalum oxide based material means a material in which a small amount of titanium dioxide ($TiO_2$) is added to tantalum pentoxide ($Ta_2O_5$).

The absence of plasma generation means that the high-frequency power supply 401 and the DC power supply 404 are not used. In this case, a film is formed by the vacuum deposition method.

In this table, RH denotes resistance heating, and EB denotes electron beam heating.

In film formation, oxygen is introduced into the vacuum chamber 412 by a valve (not shown). The oxygen introduction pressure setting is setting of an oxygen pressure in the chamber. An oxygen partial pressure preferably ranges from $3.0 \times 10^{-3}$ to $5.0 \times 10^{-2}$ Pa. When the oxygen partial pressure is adjusted in this range, a rate of change of light intensity of an optical element (to be described later) can be set at an appropriate value. A gas in the vacuum chamber 412 is exhausted from an exhaust port 411.

A function of the plasma will be described below. The plasma is generated in the vacuum chamber 412 by the high-frequency power supply 401. When particles of the evaporated material pass through the plasma, the particles become in the ionized state. The ionized particles are assisted by the plasma, and the particles impinge energetically on the base 408 to be deposited on the base 408. Therefore, the dense film is formed.

As described later in detail, an ambient gas pressure has an influence on the plasma generation, and there is a gas pressure at which gas is ionized to efficiently produce the plasma.

Three kinds of optical elements (comparative examples 1 to 3) illustrated in following Table 2 are prepared in order to compare with the optical element of the embodiment of FIG. 1. The comparative example 3 is the optical element made of blue-laser-compatible plastic in which coating is not performed to the surface.

TABLE 2

| | Embodiment | Comparative Example 1 | Comparative Example 2 | Comparative Example 3 |
|---|---|---|---|---|
| Substrate Material | Blue-laser-compatible Plastic | PMMA Based Plastic | Blue-laser-Compatible Plastic | Blue-laser-Compatible Plastic |
| Method for Forming High-refractive-index Material Layer | Ion Plating Method | Ion Plating Method | Vacuum Deposition Method | Without Film |

Figure 2:
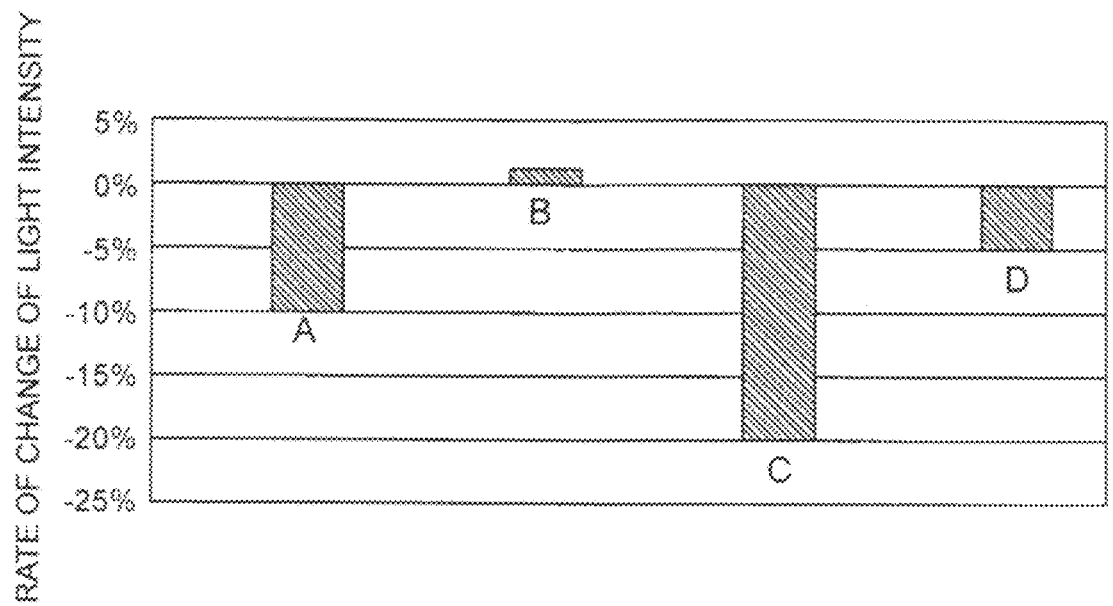
FIG. 2 is a graph showing a result obtained by measuring a rate of change of light intensity of an optical element after a blue laser is irradiated on the optical element for 1000 hours.

FIG. 2 is a graph showing a result obtained by measuring a rate of change of light intensity of an optical element after a blue laser is irradiated on the optical element at an ambient temperature of 25° C. for 1000 hours. The energy density of blue laser irradiation is about 120 mW/mm$^2$. In this case, a rate of change of light intensity of the optical element can be expressed by the following equation.

Rate of change of light intensity=((transmittance after irradiation/transmittance before irradiation)−1)·100%

As an example, when the transmittance before irradiation is 90% and the transmittance after irradiation is 80%, the rate of change of light intensity is given by:

((0.80/0.90)−1)·100=−11.1%

Reference symbol B in FIG. 2 indicates a measurement result of a rate of change of light intensity of the optical element according to the embodiment. Reference symbol A in FIG. 2 indicates a measurement result of a rate of change of light intensity of the first comparative example. Reference symbol C in FIG. 2 indicates a measurement result of a rate of change of light intensity of the second comparative example. Reference symbol D in FIG. 2 indicates a measurement result of a rate of change of light intensity of an optical element according to the third comparative example. The optical element according to the third comparative example is irradiated with a blue laser in a nitrogen atmosphere.

Figure 3:
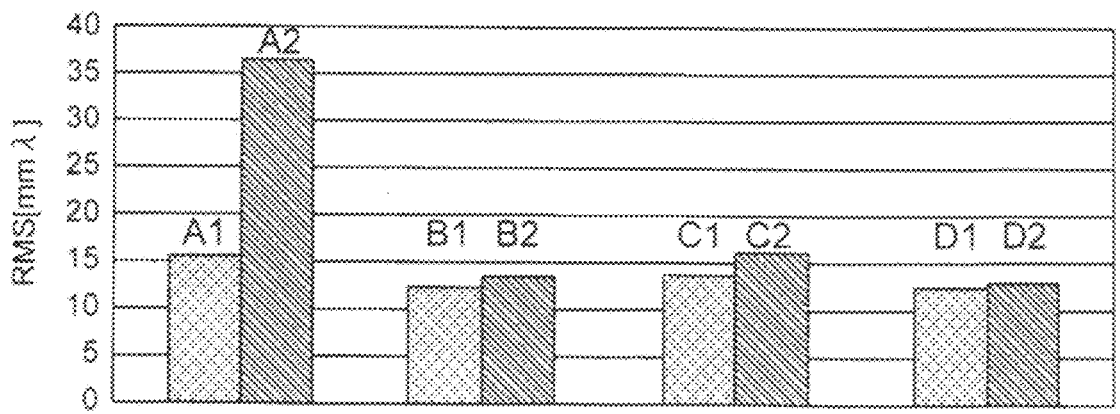
FIG. 3 is a graph showing results obtained by measuring total wavefront aberrations (RMS) of the optical element before and after the blue laser is irradiated on the optical element for 1000 hours.

FIG. 3 is a graph showing results obtained by measuring total wavefront aberrations (RMS) of optical elements before and after the blue laser is irradiated on the optical element at an ambient temperature of 25° C. for 1000 hours. An energy density of blue laser irradiation is about 120 mW/mm$^2$.

The total wavefront aberration is obtained by expressing a misalignment of a wavefront from a reference sphere by a standard deviation. In this case, the reference sphere is a sphere which intersects with an optical axis at the center of entrance and exit pupils such that a principal ray is focused on. In measurement of the total wavefront aberration, an interference band is generated by an interferometer. The wavefront aberration is calculated from a map of the interference band.

Reference symbols B1 and B2 in FIG. 3 indicate measurement results of total wavefront aberrations of the optical element according to the present embodiment. Reference symbols A1 and A2 in FIG. 3 indicate measurement results of total wavefront aberrations in the first comparative example. Reference symbols C1 and C2 in FIG. 3 indicate measurement results of total wavefront aberrations in the second comparative example. Reference symbols D1 and D2 in FIG. 3 indicate measurement results of total wavefront aberrations of the optical element according to the third comparative example. The optical element according to the third comparative example is irradiated with a blue laser in a nitrogen atmosphere. Reference symbols A1, B1, C1, and D1 indicate measurement results of total wavefront aberrations before the blue laser is irradiated, while reference symbols A2, B2, C2, and D2 indicate measurement results of total wavefront aberrations after the blue laser is irradiated.

The following points will be apparent from the measurement results in FIGS. 2 and 3. In the present embodiment, even after it has been irradiated with a high-power blue laser for 1000 hours, the light intensity remains almost unchanged. Furthermore, the total wavefront aberrations after the irradiation remain almost unchanged in comparison with those before the irradiation.

The rate of change of light intensity decreases by about 10% in the first comparative example (A in FIG. 2), about 20% in the second comparative example (C in FIG. 2), and about 5% in the third comparative example (D in FIG. 2). In the second comparative example in which the ion plating method is not used in formation of a high-refractive-index layer (C in FIG. 2), the rate of change of light intensity is high. More specifically, a light transmittance intensity of the optical element considerably decreases. The light transmittance intensity of the optical element decreases for the following reason. That is, when a high-power blue laser is irradiated for a long period of time, chemical bonds of the plastic serving as a polymer may be broken (damaged) to change a bonding state. When the ion plating method is used in formation of a high-refractive-index layer, the above damage is suppressed.

When the coat-less optical element according to the third comparative example is placed in a nitrogen atmosphere, a decrease in light transmittance intensity is relatively small. Then, it is inferred that a material except for nitrogen in the air should accelerate damage of the optical element. Therefore, it can be considered that a rate of mixing the material in the air which accelerates damage of the optical element into the optical element can be decreased by using the ion plating method in formation of a high-refractive-index layer.

The total wavefront aberration obtained after irradiation of the high-power blue laser is about 2.5 times that in the first comparative example (A1 and A2 in FIG. 3) in which a PMMA-based plastic is used. The total wavefront aberration obtained after irradiation of a high-power blue laser remains almost unchanged in the second and third comparative examples. For this reason, in the optical element using a blue-laser-coping plastic, it is considered the shape of the optical element surface remains almost unchanged. On the other hand, in the optical element using the PMMA-based plastic, it is considered the total wavefront aberration may increase because the shape of the optical element surface has changed.

In the embodiment, films are formed by the ion plating method. However, the film may be formed while a plasma state is generated by a plasma CVD method, an ion beam assist deposition method, sputtering method or the like.

The present invention is characterized in that a film is formed on a substrate consisting of a blue-laser-coping plastic material by a plasma generating method such as an ion plating method.

According to the characteristic, the above remarkable effect is achieved with respect to suppression of damage of the optical element caused by a laser. A mechanism which achieves the effect is considered as follows.

A catalytic action which operates to create an action having oxidation decomposition from moisture or oxygen may be suppressed by using a substrate consisting of a thermoplastic transparent resin cycloolefin polymer having an antioxidant function and by increasing a film denseness by film formation by the ion plating method (forming an oxygen impermeability film). Therefore, it can be presumed that substrate damage by a blue laser beam is suppressed. A ground for causing this presumption is also expected from the measurement result (D in FIG. 2) of a rate of change of light intensity when a laser irradiation experiment is performed in a nitrogen atmosphere. It is considered that use of tantalum oxide in film formation by the ion plating method further improves the denseness of the film.

As another embodiment, a multi-layered film formed by the following film forming method will be described below. The multi-layered film formed by this film forming method is called improved film 1.

where
λ: wavelength of incident light
n(s): refractive index of substrate
n(m): refractive index of medium
n(j): refractive index of material of j-th layer
d(j): film thickness of j-th layer A reflectivity (R) and a transmittance (T) can be obtained by the following equation:

$$R = \frac{(n(m) \cdot A - n(s)D)^2 + (n(m) \cdot n(s)B - C)^2}{(n(m) \cdot A + n(s)D)^2 + (n(m) \cdot n(s)B + C)^2}$$

$$T = \frac{4n(m)^2}{(n(m) \cdot A + n(s)D)^2 + (n(m) \cdot n(s)B + C)^2}$$

At this point, the wavelength used, the light incident angle, and optical characteristics specification (reflectivity and transmittance) depend on required specifications in designing

TABLE 3

| | Film Configuration | $O_2$ Introduction Pressure Setting (Pa) | Ar Introduction Pressure Setting (Pa) | Film Forming Rate Setting | Film Thickness (measure) | Deposition Time (minute) (measure) | Evaporation Source | Plasma Generation |
|---|---|---|---|---|---|---|---|---|
| First Layer | SiO | 2.80E−02 | | 3.0 Å/S | 2440 Å | 13.5 | RH | None |
| Second Layer | $SiO_2$ | | 6.00E−03 | 10 Å/S | 1650 Å | 2.8 | EB | Present |
| Third Layer | Tantalum-oxide-based material | 3.00E−02 | | 3.0 Å/S | 125 Å | 1.7 | EB | Present |
| Fourth Layer | $SiO_2$ | | 6.00E−03 | 10 Å/S | 300 Å | 0.6 | EB | Present |
| Fifth layer | Tantalum-oxide-based material | 3.00E−02 | | 3.0 Å/S | 330 Å | 1.8 | EB | Present |
| Sixth Layer | $SiO_2$ | | 6.00E−03 | 10 Å/S | 630 Å | 1.0 | EB | Present |
| | | | | Total Film Thickness | 5475 Å | | | |

In Table 3, the tantalum oxide based material means a material in which a small amount of titanium dioxide ($TiO_2$) is added to tantalum pentoxide ($Ta_2O_5$).

A method for determining a film thickness of each layer included in the multi-layered film will be described below.

Figure 16:
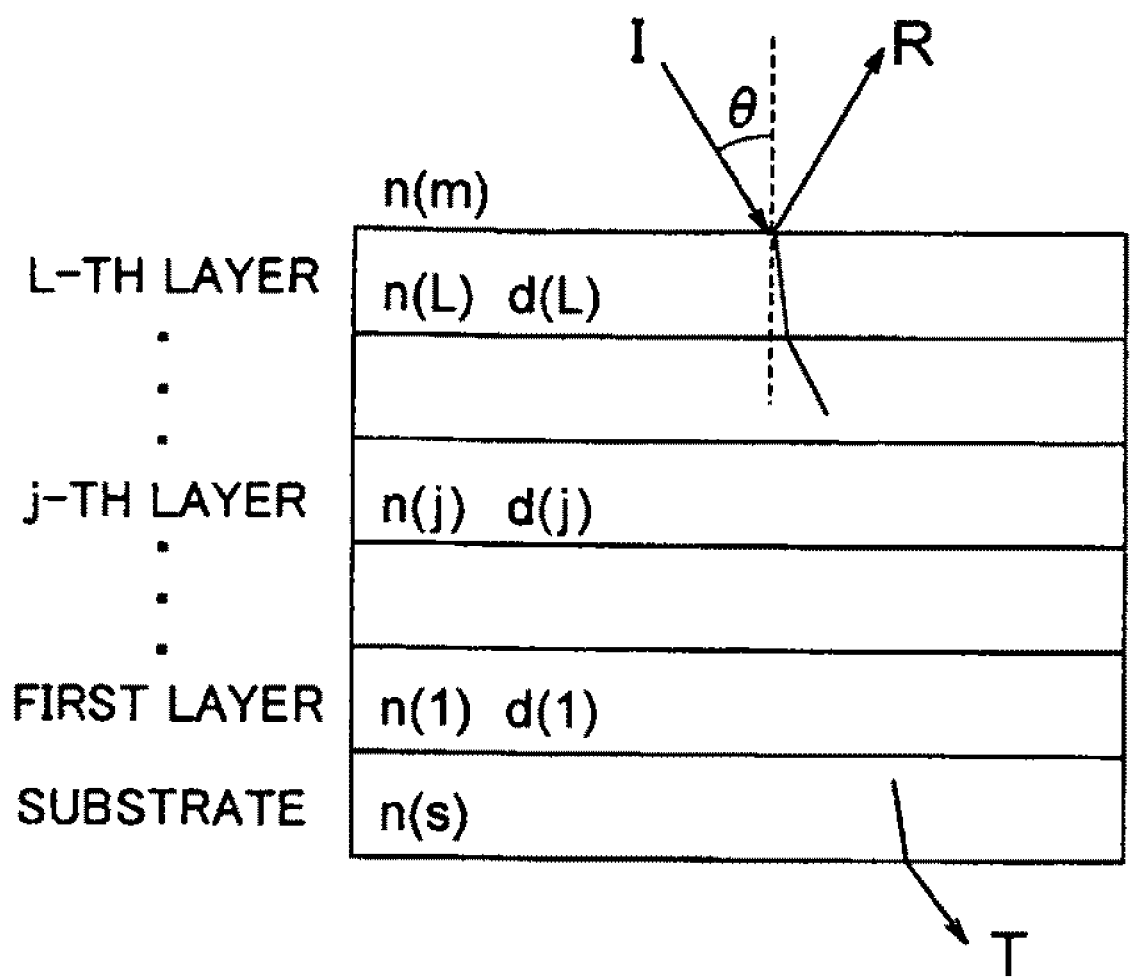
FIG. 16 illustrates a configuration of a multi-layered film having an L-layer structure.

FIG. 16 illustrates a configuration of a multi-layered film having an L-layer structure. As shown in FIG. 16, it is assumed n(j) is a refractive index of a j-th layer and d(j) is a film thickness in a multi-layered optical thin film system having an L-layer structure. An optical characteristic can be expressed by the following characteristic matrix when light having a wavelength λ is incident to the optical system of FIG. 16 with an incident angle θ. In FIG. 16, I is incident light.

$$M = M(L) \cdot M(L-1) \ldots M(j) \ldots M1$$

M is a two-by-two matrix, and a matrix of each layer also becomes the two-by-two matrix. M(j) means a matrix of the j-th layer, and M(j) can be expressed as follows:

$$M(j) = \begin{bmatrix} \cos\delta(j) & i/n(j) \cdot \sin\delta(j) \\ i \cdot n(j) \cdot \sin\delta(j) & \cos\delta(j) \end{bmatrix} = \begin{bmatrix} A & i \cdot B \\ i \cdot C & D \end{bmatrix}$$

at this point, $$\delta(j) = (2\pi/\lambda) \cdot (n(j) \cdot d(j) \cdot \cos\theta(j))$$

the optical thin film. The refractive indexes of the substrate, film, and medium are obtained as measured data by the measurement.

In designing the multi-layered film, the film thickness of each layer is determined from the measured data and required specifications based on the above-described principle so as to satisfy the required optical characteristics (reflectivity and transmittance).

A film forming method in Table 3 is different from the film forming method in Table 1 in that a low-refractive-index layer consisting of silicon dioxide is formed in an argon atmosphere while generating a plasma state. An argon partial pressure in formation of the low-refractive-index layer preferably ranges from $3.0 \times 10^{-3}$ to $5.0 \times 10^{-2}$ Pa. When the low-refractive-index layer is formed in an argon atmosphere while generating a plasma state, even though a substrate is exposed to a high-temperature environment (for example, 85° C.) or a high-temperature and high-humidity environment (for example, 60° C. and 90%) for a long time, an amount of change in transmittance is almost zero. The argon atmosphere is more advantageous than an oxygen plasma atmosphere.

In the film forming method of Table 3, a high-frequency power supply for generating the plasma has an output of 500 W. A DC voltage is set at 300V.

Then, the optical element characteristic is observed by changing the producing conditions. Specifically the optical element characteristic is an oxygen permeability coefficient. The reason the oxygen permeability coefficient is noticed is that, as described later, an amount of change in light transmittance of the optical element becomes small when the optical element has the low oxygen permeability coefficient.

The gas permeability coefficient is generally expressed by the following equation:

gas permeability coefficient=gas permeability amount (volume in normal state)×thickness/(pressure difference×permeability area×time)

where a unit of oxygen permeability coefficient is $cm^3 \cdot mm/(m^{20} \cdot 24\ hr \cdot atm)$.

Figure 12:
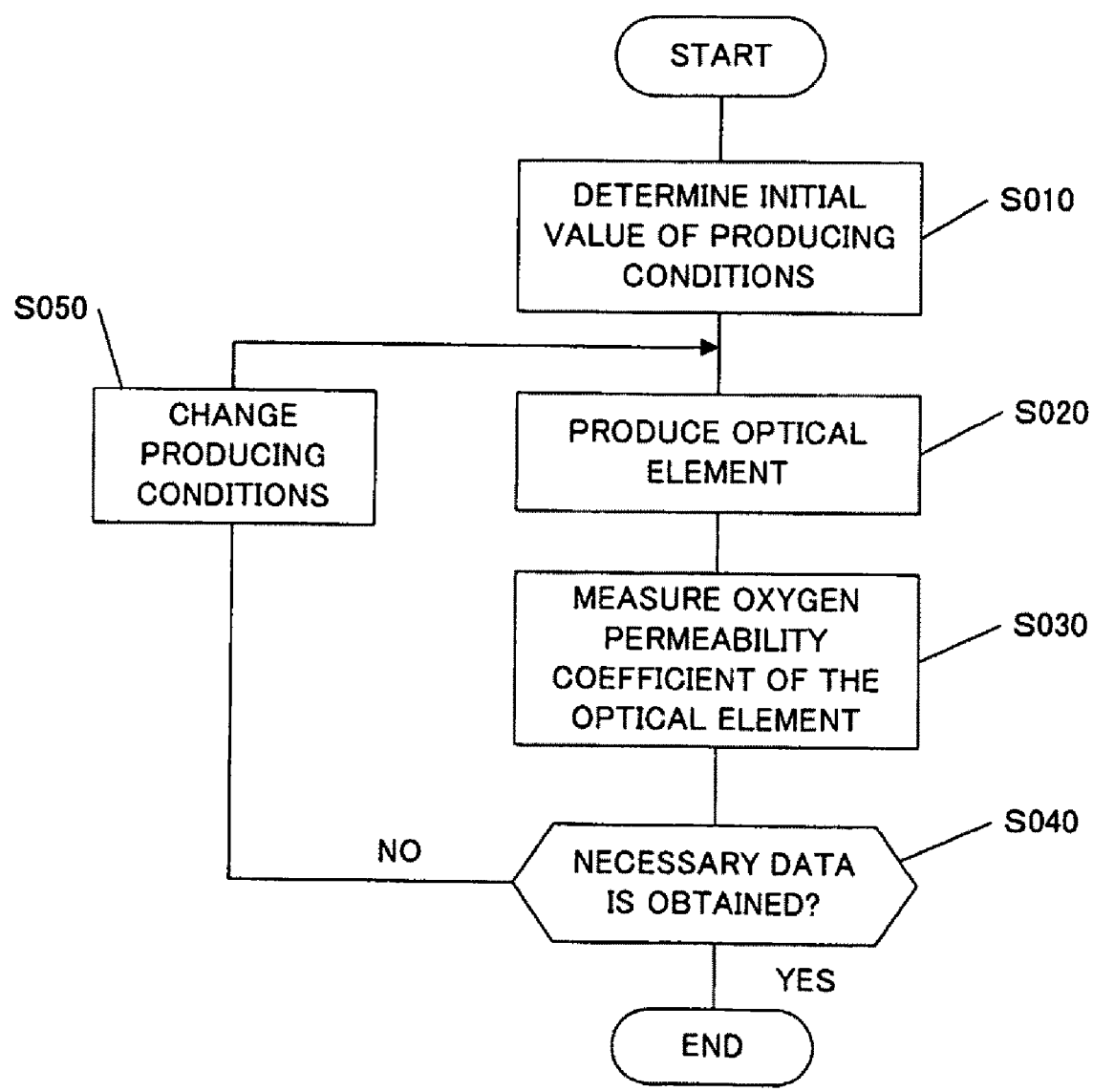
FIG. 12 is a flowchart illustrating a method for changing producing conditions to determine conditions for producing an optical element having a small oxygen permeability coefficient.

FIG. 12 is a flowchart illustrating a method for determining conditions for producing an optical element having a small oxygen permeability coefficient by changing producing conditions when forming a multi-layered film on a substrate made of thermoplastic transparent resin cycloolefin polymer.

Referring to FIG. 12, in Step S010, initial values of the producing conditions are determined.

In Step S020, the optical element is produced according to the producing conditions.

In Step S030, the oxygen permeability coefficient of the produced optical element is measured.

In Step S040, a determination whether necessary data is obtained is made. When the necessary data is obtained, the method for determining the optical element producing conditions is ended. When the necessary data is not obtained, the flow goes to Step S050.

In Step S050, the producing conditions are changed.

Figure 13:
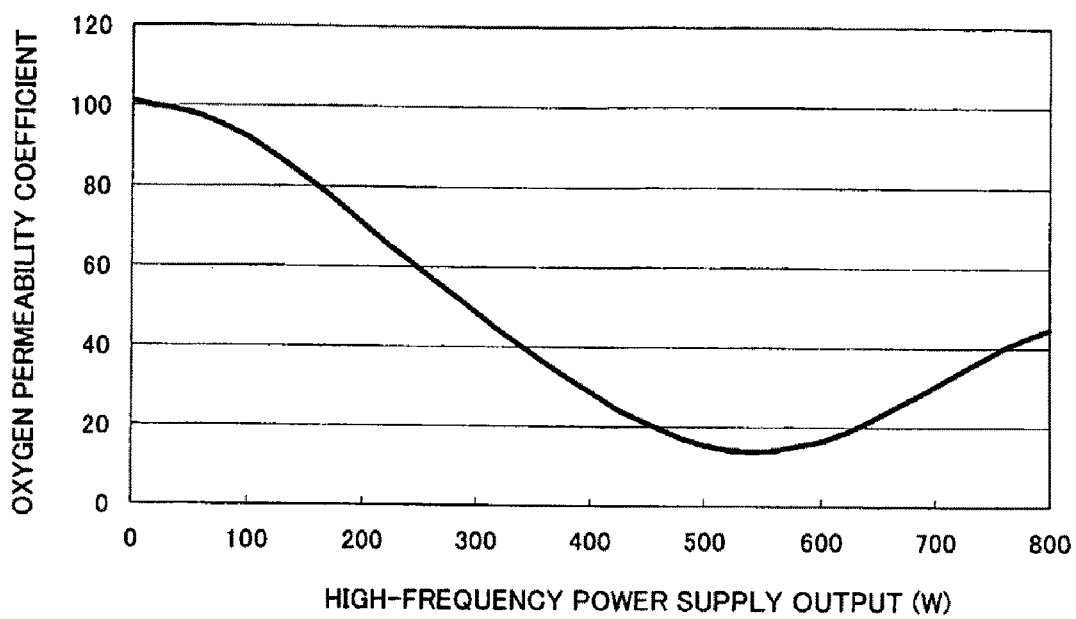
FIG. 13 illustrates a change in oxygen permeability coefficient of the optical element when an output of a high-frequency power supply is changed.

FIG. 13 illustrates a change in oxygen permeability coefficient of the optical element when the output of the high-frequency power supply is changed. Table 3 illustrates the producing conditions such as the argon pressure value in forming the low-refractive-index material and the oxygen pressure value in forming the high-refractive-index material. The oxygen permeability coefficient of the produced optical element is largely changed by the output of the high-frequency power supply during the production, and the oxygen permeability coefficient is minimized in the case of 500 W to 600 W.

Oxygen is introduced instead of argon in forming the low-refractive-index material, and the pressure value is set at $6 \times 10^{-3}$ Pa to change the output of the high-frequency power supply. In such cases, when the change in oxygen permeability coefficient of the optical element is observed, the oxygen permeability coefficient is monotonously decreased as the output of the high-frequency power supply is increased. The oxygen permeability coefficient becomes about 110 $cm^3 \cdot mm/(m^2 \cdot 24\ hr \cdot atm)$ when the high-frequency power supply has the output of 0 W, and the oxygen permeability coefficient becomes 40 $cm^3 \cdot mm/(m^2 \cdot 24\ hr \cdot atm)$ when the high-frequency power supply has the output of 800 W.

Figure 14:
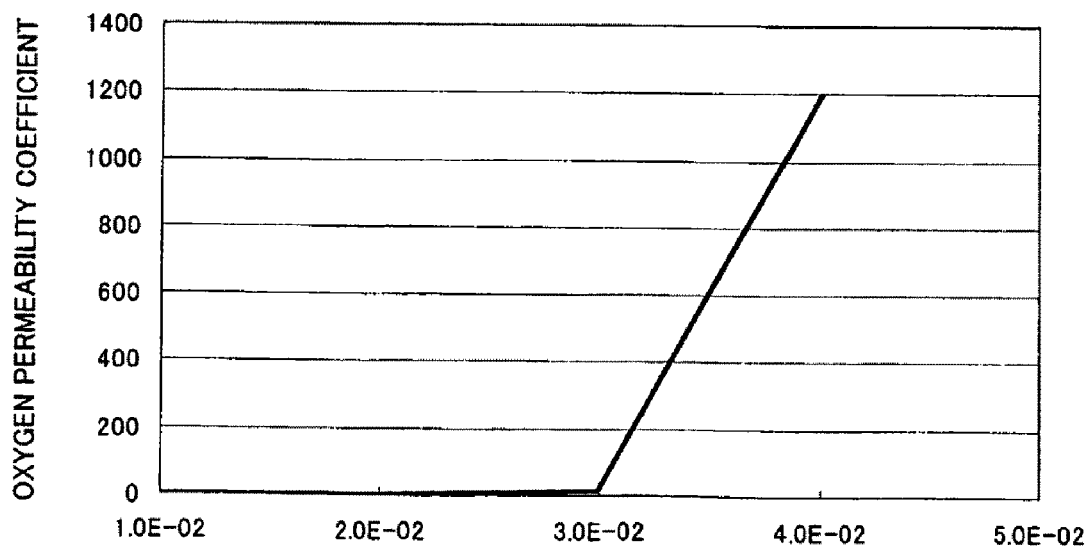
FIG. 14 illustrates a change in oxygen permeability coefficient of the optical element when an oxygen pressure value is changed in forming a high-refractive-index material.

FIG. 14 illustrates a change in oxygen permeability coefficient of the optical element when the oxygen pressure value is changed in forming the high-refractive-index material. Table 3 illustrates the argon pressure value in forming the low-refractive-index material. The high-frequency power supply has the output of 500 W. The oxygen permeability coefficient of the optical element is largely changed by the oxygen pressure value in forming the high-refractive-index material. The oxygen permeability coefficient is equal to or lower than 20 $cm^3 \cdot mm/(m^2 \cdot 24\ hr \cdot atm)$ when the oxygen pressure value is equal to or lower than $3 \times 10^{-2}$ Pa, and the oxygen permeability coefficient is rapidly increased when the oxygen pressure value is larger than $3 \times 10^{-2}$ Pa.

The oxygen is introduced instead of the argon in forming the low-refractive-index material, the pressure value is set at $6 \times 10^{-3}$ Pa, and the output of the high-frequency power supply is set at 500 W to change the oxygen pressure value in forming the high-refractive-index material. In such cases, when the change in oxygen permeability coefficient of the optical element is observed, the oxygen permeability coefficient of the optical element is largely changed by the oxygen pressure value in forming the high-refractive-index material, and the oxygen permeability coefficient becomes equal to or lower than 30 $cm^3 \cdot mm/(m^2 \cdot 24\ hr \cdot atm)$ when the oxygen pressure value is equal to or lower than $1.5 \times 10^{-2}$ Pa in forming the high-refractive-index material.

Figure 15:
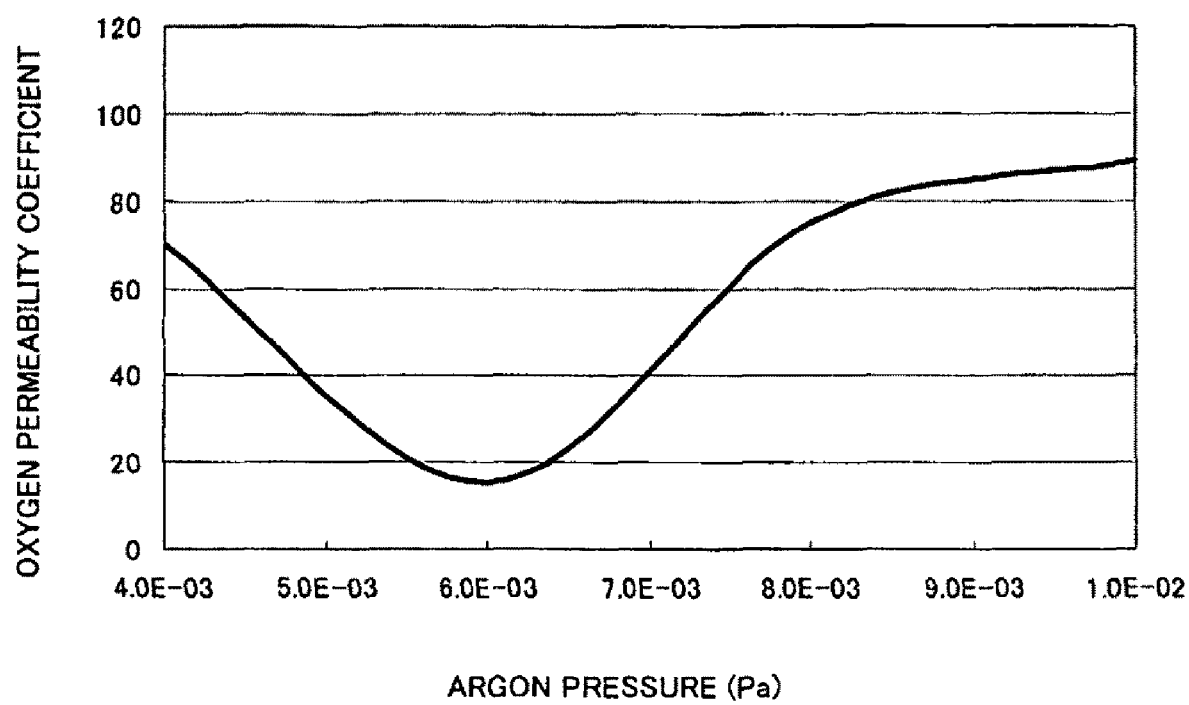
FIG. 15 illustrates a change in oxygen permeability coefficient of the optical element when an argon pressure value is changed in forming a low-refractive-index material.

FIG. 15 illustrates a change in oxygen permeability coefficient of the optical element when the argon pressure value is changed in forming the low-refractive-index material. Table 3 illustrates the oxygen pressure value in forming the high-refractive-index material. The high-frequency power supply has the output of 500 W. The oxygen permeability coefficient of the optical element is largely changed by the argon pressure value in forming the low-refractive-index material, and the oxygen permeability coefficient is minimized in the case of $5 \times 10^{-3}$ Pa to $7 \times 10^{-3}$ Pa.

The oxygen pressure value is set at $3 \times 10^{-2}$ Pa in forming the high-refractive-index material, the output of the high-frequency power supply is set at 500 W, and the oxygen is introduced instead of the argon in forming the low-refractive-index material to change the oxygen pressure value. In such cases, when the change in oxygen permeability coefficient of the optical element is observed, the oxygen permeability coefficient is monotonously increased as the oxygen pressure value is increased. The oxygen permeability coefficient is about 60 $cm^3 \cdot mm/(m^2 \cdot 24\ hr \cdot atm)$ when the oxygen pressure value is $4 \times 10^{-3}$ Pa, and the oxygen permeability coefficient is about 80 $cm^3 \cdot mm/(m^2 \cdot 24\ hr \cdot atm)$ when the oxygen pressure value is $1 \times 10^{-2}$ Pa.

In summary, the optical element having the small oxygen permeability coefficient is produced under the following conditions. That is, the high-frequency power supply has the output of 500 W to 600 W, the oxygen pressure value is equal to or lower than $3 \times 10^{-2}$ Pa in forming the high-refractive-index material, the argon gas is introduced as the ambient gas in forming the low-refractive-index material, and the argon pressure value ranges from $5 \times 10^{-3}$ Pa to $7 \times 10^{-3}$ Pa. This is attributed to that fact that the optimum plasma, in which the particles of the film forming material are ionized and deposited, is generated under the conditions to form the dense film through which the oxygen is hardly permeated. At this point, in forming the low-refractive-index material, the inert gas such as the argon gas is introduced as the ambient gas while the oxygen is not introduced, thereby advantageously producing the optical element having the small oxygen permeability coefficient. The conditions of Table 3 are matched with the above-described conditions.

The above-described conditions indicate only the numerical range in the embodiment. Generally, the conditions for producing the optical element having the small oxygen permeability coefficient can be obtained by changing the output of the high-frequency power supply, the ambient gas pressure value in forming the high-refractive-index material, and the ambient gas pressure value in forming the low-refractive-index material, according to the method shown in FIG. 12.

As still another embodiment, a multi-layered film formed by the following film forming method will be described below. The multi-layered film formed by this film forming method is called improved film 2.

TABLE 4

| | Film Configuration | O₂ Introduction Pressure Setting (Pa) | Ar Introduction Pressure Setting (Pa) | Film Forming Rate Setting | Film Thickness (measure) | Deposition Time (minute) (measure) | Evaporation Source | Plasma Generation |
|---|---|---|---|---|---|---|---|---|
| First Layer | Tantalum-oxide-based material | 3.00E−02 | | 3.0 Å/S | 120 Å | 0.8 | EB | Present |
| Second Layer | SiO2 | | 6.00E−03 | 10 Å/S | 230 Å | 0.3 | EB | Present |
| Third Layer | Tantalum-oxide-based material | 3.00E−02 | | 3.0 Å/S | 840 Å | 4.8 | EB | Present |
| Fourth Layer | SiO2 | | 6.00E−03 | 10 Å/S | 630 Å | 1.0 | EB | Present |
| | | | | Total Film Thickness | 1820 Å | | | |

In Table 4, the tantalum oxide based material means a material in which a small amount of titanium dioxide ($TiO_2$) is added to tantalum pentoxide ($Ta_2O_5$).

Improved film 2 does not include an adhesion layer consisting of silicon monoxide but includes a layer consisting of a tantalum-oxide-based material as a first layer on the substrate. The total film thickness of improved film 1 is 547.5 nm, whereas the total film thickness of improved film 2 is 182.0 nm. In a diffraction optical element having a surface on which a fine structure is formed, when a film thickness is large, influence on the shape of the fine structure increases. Since improved film 2 is thin, influence on the shape of the fine structure is small.

In the film forming method of Table 4, the high-frequency power supply for generating the plasma has the output of 500 W. The DC voltage is set at 300V.

A multi-layered film which has the same structure as that of improved film 2 and which is formed according to a vacuum deposition method which does not generate plasma, is called a conventional film.

Table 5 illustrates film forming conditions for the conventional film.

Figure 5:
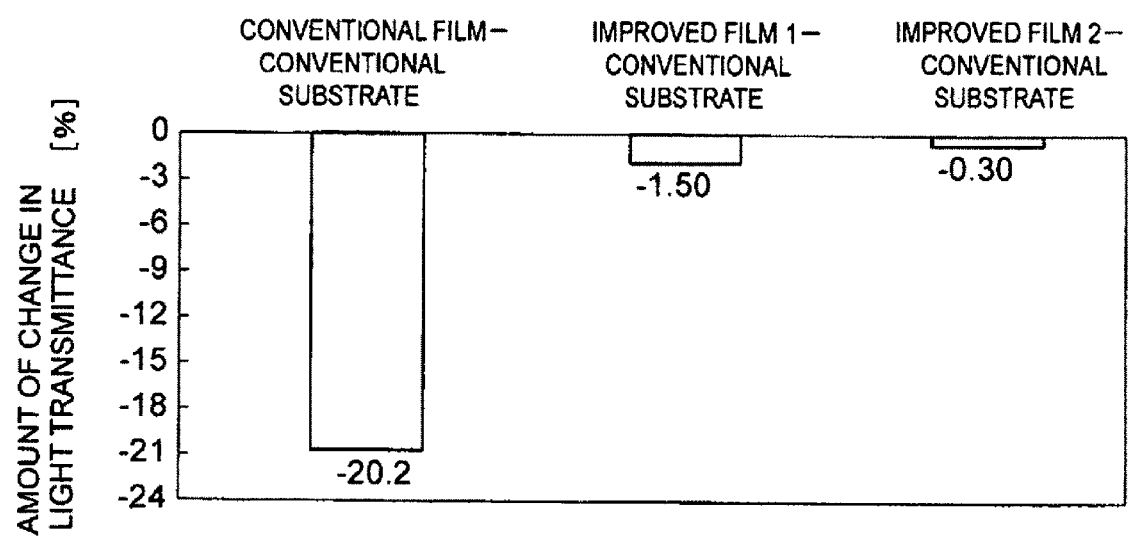
FIG. 5 is a graph showing an amount of change in light transmittance of an optical element obtained by forming a conventional film on a conventional substrate and an optical element obtained by forming improved films 1 and 2 on the conventional substrate.

FIG. 5 is a graph showing an amount of change in light transmittance of an optical element obtained by forming a conventional film on a conventional substrate and optical elements obtained by forming improved films 1 and 2 on the conventional substrates. The amounts of change in light transmittance of the optical elements in which improved films 1 and 2 are formed are considerably improved in comparison with the amount of change in light transmittance of the optical element in which the conventional film is formed.

Figure 6:
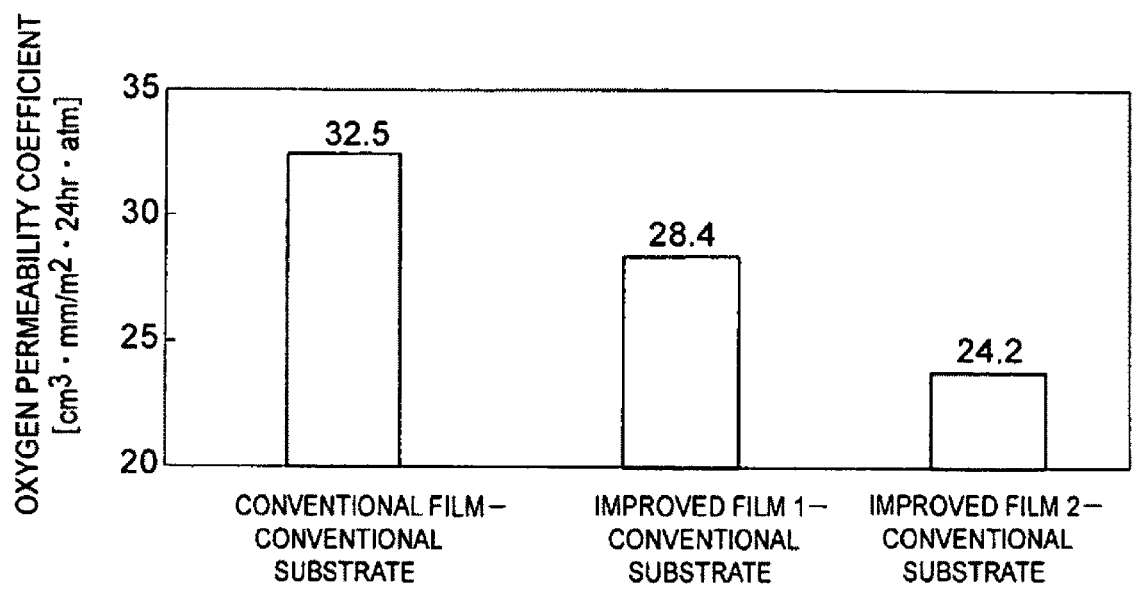
FIG. 6 is a graph showing oxygen permeability coefficients of the optical element obtained by forming the conventional film on the conventional substrate and the optical element obtained by forming improved films 1 and 2 on the conventional substrate.

FIG. 6 is a graph showing oxygen permeability coefficients of the optical element obtained by forming the conventional film on the conventional substrate and the optical element obtained by forming improved films 1 and 2 on the conventional substrate.

Oxygen permeability coefficients of the optical elements obtained by forming improved films 1 and 2 on the conventional substrate are smaller than the oxygen permeability coefficient of the optical element obtained by forming the conventional film on the conventional substrate. The optical elements obtained by forming improved films 1 and 2 on the conventional substrate do not easily transmit oxygen.

As a result, it is presumed that when the optical element is irradiated with a blue laser, deterioration of the substrate

TABLE 5

| | Film Configuration | O₂ Introduction Pressure Setting [Pa] | Film Forming Rate Setting [Å/sec] | Film Thickness (Rough Indication) [Å] | Deposition Time (Rough Indication) [min] | Evaporation Source | Plasma Generation |
|---|---|---|---|---|---|---|---|
| First Layer | Titanium Oxide Based Material | 1.60E−02 | 3.0 | 120 | 0.8 | EB | None |
| Second Layer | SiO₂ | 6.00E−03 | 10.0 | 230 | 0.3 | EB | None |
| Third Layer | Titanium Oxide Based Material | 1.60E−02 | 3.0 | 840 | 4.8 | EB | None |
| Fourth Layer | SiO₂ | 6.00E−03 | 10.0 | 630 | 1.0 | EB | None |

In Table 5, the titanium oxide based material is titanium dioxide ($TiO_2$).

A substrate which is not a substrate molded in a nitrogen atmosphere (will be described later) and which consists of a thermoplastic transparent cycloolefin polymer is called a conventional substrate.

material is accelerated by a chemical reaction caused by the medium of oxygen and that the amount of change in light transmittance increases. This presumption conforms to the fact that a decrease in light transmittance is relatively small when the uncoated optical element of the third comparative example is placed in a nitrogen atmosphere.

More specifically, when a multi-layered film having a small oxygen permeability coefficient is formed, the amount of change in light transmittance of the optical element can be suppressed.

Figure 24:
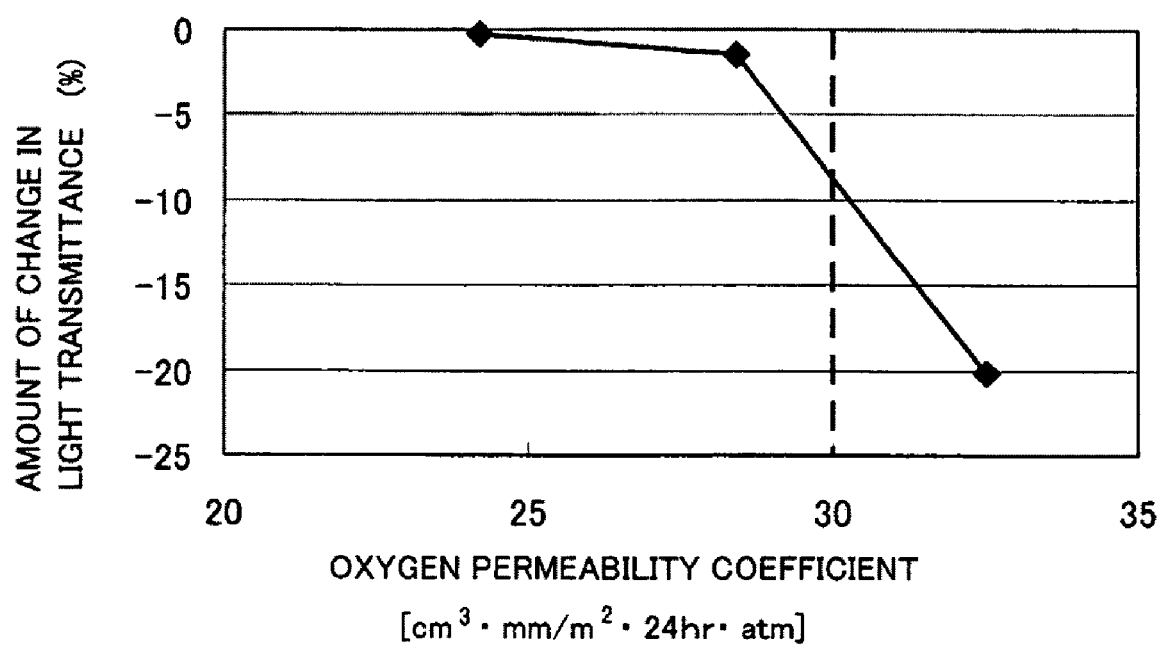
FIG. 24 illustrates a relationship between an oxygen permeability coefficient and an amount of change in light transmittance.

FIG. 24 illustrates a relationship between an oxygen permeability coefficient and an amount of change in light transmittance. Referring to FIG. 24, the amount of change in light transmittance is remarkably lowered when the oxygen permeability coefficient of the optical element is equal to or lower than 30 cm$^3$·mm/(m$^2$·24 hr·atm).

Figure 7:
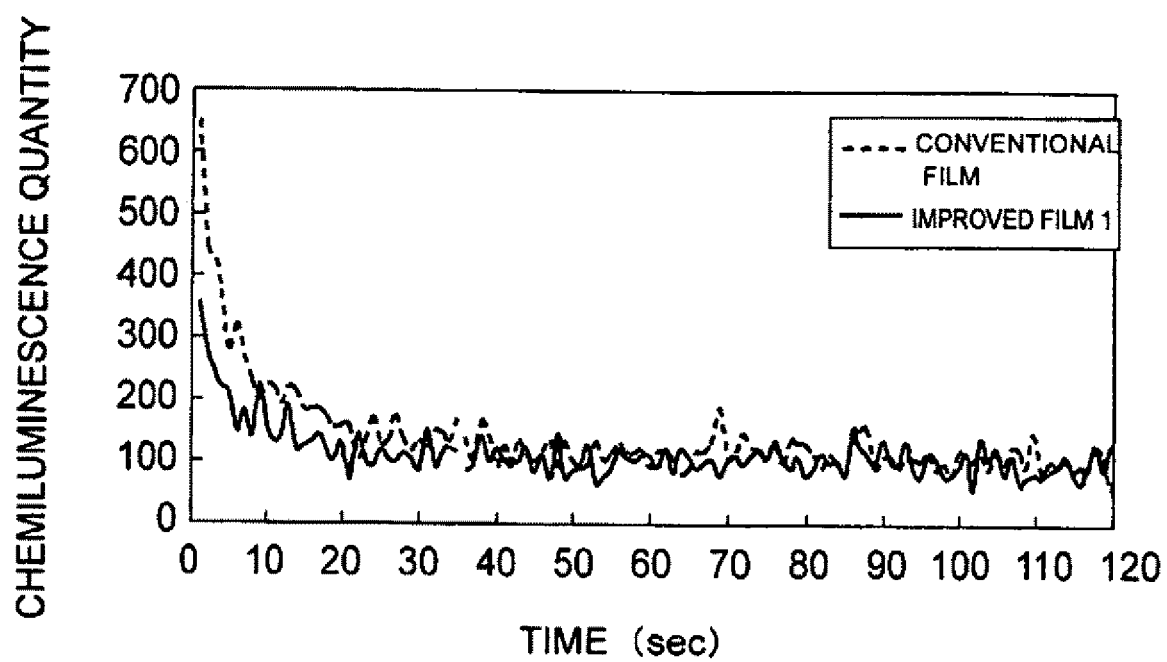
FIG. 7 is a graph showing a change in chemiluminescence quantity after a blue laser is irradiated on the optical element obtained by forming the conventional film on the conventional substrate and the optical element obtained by forming improved film 1 on the conventional substrate and then stopped.
Figure 8:
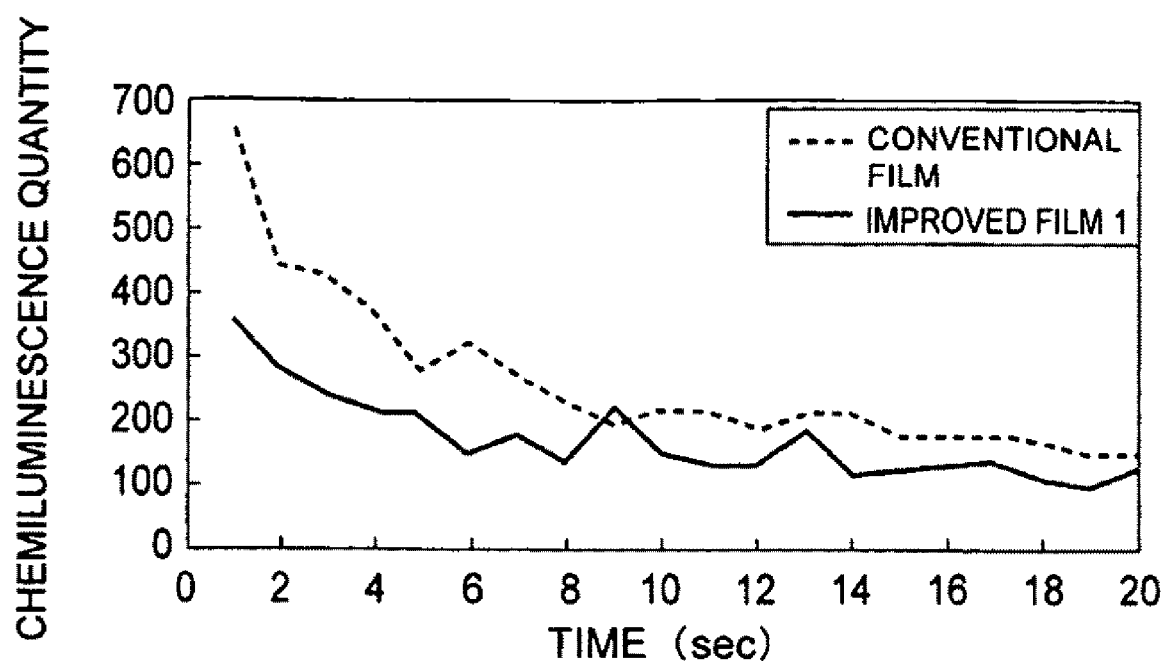
FIG. 8 is a graph showing a part of FIG. 7 in which a time axis is enlarged.

FIG. 7 is a graph showing a change in chemiluminescence quantity after a blue laser is irradiated on the optical element obtained by forming the conventional film on the conventional substrate and the optical element obtained by forming improved film 1 on the conventional substrate and then stopped. FIG. 8 is a graph showing a part of FIG. 7 in which a time axis is enlarged. In FIGS. 7 and 8, the chemiluminescence quantity indicates a relative magnitude. For 20 seconds after the stop of irradiation, the chemiluminescence quantity of the optical element obtained by forming the conventional film on the conventional substrate is larger than the chemiluminescence quantity of the optical element obtained by forming improved film 1 on the conventional substrate. It is said that chemiluminescence is caused by a reaction by the medium of oxygen. It is considered that the optical element obtained by forming improved film 1 on the conventional substrate suppresses a chemical reaction of a substrate material caused by the medium of oxygen because the optical element has an oxygen permeability coefficient smaller than that of the optical element obtained by forming the conventional film on the conventional substrate and does not easily transmit oxygen. Accordingly, the optical element has the small amount of change in light transmittance when having the small oxygen permeability coefficient.

Figure 9:
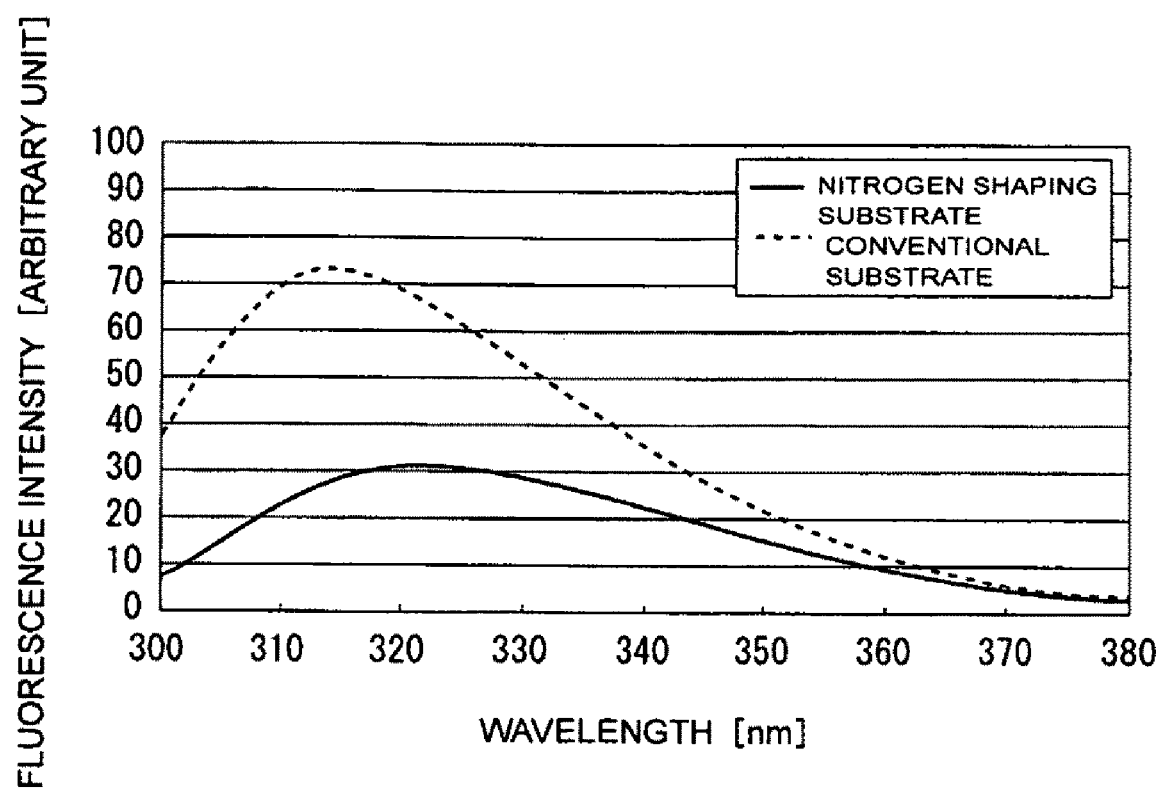
FIG. 9 is a graph showing fluorescence quantities of the conventional substrate and the substrate molded in a nitrogen atmosphere at a wavelength of about 320 nm in excitation at a wavelength of 280 nm.

FIG. 9 is a graph showing a quantity of fluorescence of the conventional substrate and a substrate molded in a nitrogen atmosphere at a wavelength of about 320 nm in excitation at a wavelength of 280 nm. The substrate molded in a nitrogen atmosphere is a substrate which is molded in a nitrogen atmosphere such that a thermoplastic transparent resin cycloolefin polymer is dried in a nitrogen atmosphere and transported in the nitrogen atmosphere. In FIG. 9, the quantity of fluorescence is an arbitrary unit and indicates a relative magnitude. Since the fluorescence is caused by the medium of oxygen, the reason why the quantity of fluorescence of the substrate molded in a nitrogen atmosphere is small is considered to be that the substrate molded in a nitrogen atmosphere has an amount of absorbed oxygen smaller than that of the conventional substrate.

Figure 10:
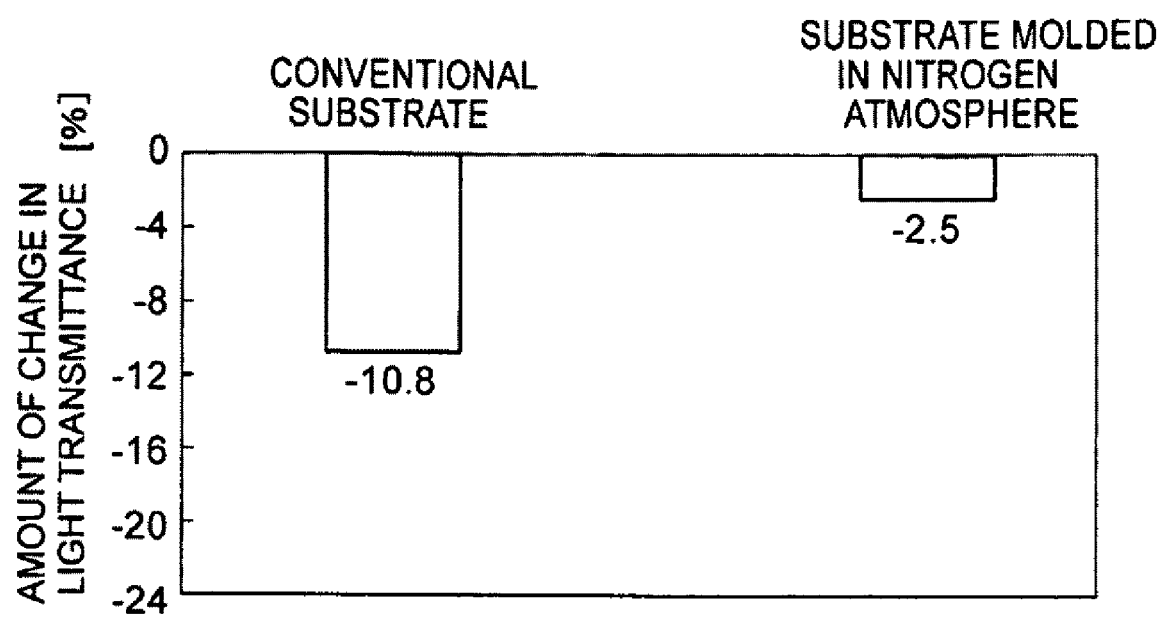
FIG. 10 is a graph showing amounts of change in light transmittance of the conventional substrate and a substrate molded in a nitrogen atmosphere.

FIG. 10 is a graph showing amounts of change in light transmittance of the conventional substrate and the substrate molded in a nitrogen atmosphere. The amount of change in light transmittance of the substrate molded in a nitrogen atmosphere is considerably smaller than the amount of change in light transmittance of the conventional substrate. In this manner, the substrate molded in a nitrogen atmosphere is not easily damaged by irradiation of a blue laser in comparison with the conventional substrate.

It is considered that damage caused by irradiation of a blue laser proceeds by a chemical reaction caused by the medium of oxygen. Therefore, since the substrate molded in a nitrogen atmosphere has an amount of absorbed oxygen smaller than that of the conventional substrate, it is considered that the substrate molded in a nitrogen atmosphere is not easily damaged by irradiation of a blue laser.

Figure 11:
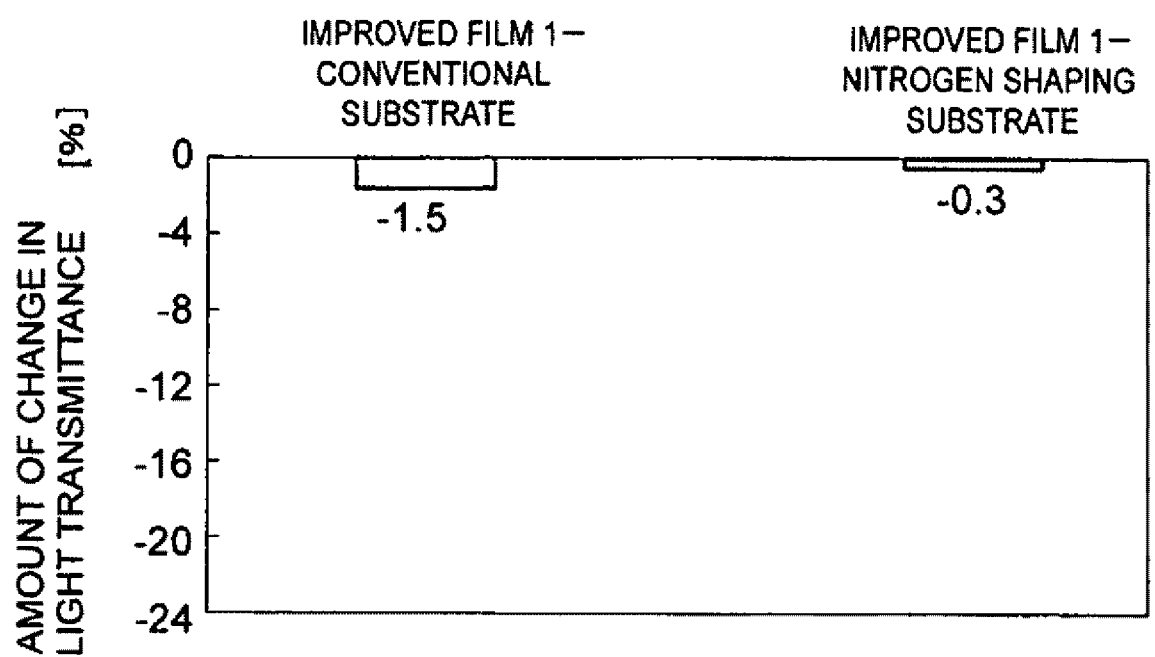
FIG. 11 is a graph showing amounts of change in light transmittance of the optical element obtained by forming improved film 1 on the conventional substrate and the optical element obtained by forming improved film 1 on the substrate molded in a nitrogen atmosphere.

FIG. 11 is a graph showing amount s of change in light transmittance of the optical element obtained by forming improved film 1 on the conventional substrate and the optical element obtained by forming improved film 1 on the substrate molded in a nitrogen atmosphere. Since the substrate molded in a nitrogen atmosphere having a small amount of absorbed oxygen and improved film 1 which does not easily transmit oxygen are combined, the amount of change in light transmittance can be suppressed to a very low level.

In the improved films 1 and 2, silicon dioxide is used as the low-refractive-index material, and a tantalum oxide based material is used as the high-refractive-index material. In addition to the silicon dioxide, examples of the low-refractive-index material include metal oxides such as aluminum oxide, metal fluorides corresponding to the metal oxides such as magnesium fluoride, yttrium fluoride, ytterbium fluoride, aluminum fluoride, calcium fluoride, and cerium fluoride, and a mixture thereof. Examples of the high-refractive-index material, as alternate materials of the tantalum oxide, include metal oxides such as titanium oxide, aluminum oxide, yttrium oxide, hafnium oxide, cerium oxide, zirconium oxide, niobium oxide, ITO, ytterbium oxide, magnesium oxide, lanthanum titanate, and aluminum lanthanate, metal fluorides corresponding to the metal oxides, and a mixture thereof.

Another embodiment in which a multi-layered film is formed by the following film forming method will be described. The multi-layered film which formed by the film forming method is referred to as improved film 3.

TABLE 6

| | Film Configuration | O2 Introduction Pressure Setting [Pa] | Ar Introduction Pressure Setting [Pa] | Film Forming Rate Setting [Å/sec] | Film Thickness (Rough Indication) [Å] | Deposition Time (Rough Indication) [min] | Evaporation Source | Plasma Generation |
|---|---|---|---|---|---|---|---|---|
| First Layer | Titanium Oxide Based Material | 2.00E−02 | — | 3.0 | 70 | 0.4 | EB | Present |
| Second Layer | SiO2 | — | 6.00E−03 | 10.0 | 200 | 0.3 | EB | Present |
| Third Layer | Titanium Oxide Based Material | 2.00E−02 | — | 3.0 | 430 | 2.4 | EB | Present |
| Fourth Layer | SiO2 | — | 6.00E−03 | 10.0 | 750 | 1.3 | EB | Present |

In the film forming method of Table 6, $SiO_2$ is used as the low-refractive-index material, and $Ti_3O_5$ that is of a titanium oxide based material is used as the high-refractive-index material. As described later, the oxygen permeability coefficient of the optical element including the improved film 3 formed by the film forming method of Table 6 is lower than that of the optical element including the improved film 2 that is formed by the film forming method of Table 4 with $SiO_2$ as the low-refractive-index material and with the tantalum oxide based material as the high-refractive-index material.

Still another embodiment in which a multi-layered film is formed by the following film forming method will be described. The multi-layered film which deposited by the film forming method is referred to as improved film 4.

TABLE 7

| | Film Configuration | $O_2$ Introduction Pressure Setting [Pa] | Ar Introduction Pressure Setting [Pa] | Film Forming Rate Setting [Å/sec] | Film Thickness (Rough Indication) [Å] | Deposition Time (Rough Indication) [min] | Evaporation Source | Plasma Generation |
|---|---|---|---|---|---|---|---|---|
| First Layer | Hafnium Oxide | 2.00E−02 | — | 3.0 | 130 | 0.7 | EB | Present |
| Second Layer | $SIO_2$ | — | 6.00E−03 | 10.0 | 250 | 0.4 | EB | Present |
| Third Layer | Hafnium Oxide | 2.00E−02 | — | 3.0 | 470 | 2.6 | EB | Present |
| Fourth Layer | $SiO_2$ | — | 6.00E−03 | 10.0 | 660 | 1.1 | EB | Present |

In the film forming method of Table 7, $SiO_2$ is used as the low-refractive-index material, and $HfO_2$ is used as the high-refractive-index material. As described later, the oxygen permeability coefficient of the optical element including the improved film 4 formed by the film forming method of Table 7 is lower than that of the optical element including the improved film 2 or the improved film 3.

Still another embodiment in which a multi-layered film is formed by the following film forming method will be described. The multi-layered film which is formed by the film forming method is referred to as improved film 5.

including the improved film 2, the improved film 3, or the improved film 4.

In the film forming method of Table 8, the point that should be noted is that the oxygen is not used as the ambient gas in forming the low-refractive-index material and the high-refractive-index material. The fact that the oxygen is not used as the ambient gas in the film forming process is advantageous to lower the oxygen permeability coefficient of the optical element.

For example, although $TiO_2$ that is of the high-refractive-index material has a stable ratio of bonding with the oxygen, Ti and $O_2$ are easily decomposed by external energy. Therefore, the bonding oxygen is deficient to become metal rich unless the oxygen is supplied, and absorption is increased to form a film that is hardly used in optical applications. Because the high-refractive-index material that can be used without oxygen has a small oxygen decomposition ability, the high-refractive-index material does not become metal rich even if the oxygen is not supplied.

Examples of the high-refractive-index material with which the use of the oxygen is not required as the ambient gas in the film forming process include zinc sulfide (ZnS), cadmium sulfide (CdS), zirconium oxide ($ZrO_2$), hafnium oxide ($HfO_2$), a mixture of zirconium oxide ($ZrO_2$) and titanium

TABLE 8

| | Film Configuration | $O_2$ Introduction Pressure Setting [Pa] | Ar Introduction Pressure Setting [Pa] | Film Forming Rate Setting [Å/sec] | Film Thickness (Rough Indication) [Å] | Deposition Time (Rough Indication) [min] | Evaporation Source | Plasma Generation |
|---|---|---|---|---|---|---|---|---|
| First Layer | $La_xAl_yO_z$ | — | 6.00E−03 | 4.0 | 420 | 1.8 | EB | Present |
| Second Layer | $SiO_2 + Al_2O_3$ | — | 6.00E−03 | 10.0 | 210 | 0.4 | EB | Present |
| Third Layer | $La_xAl_yO_z$ | — | 6.00E−03 | 4.0 | 210 | 0.9 | EB | Present |
| Fourth Layer | $SiO_2 + Al_2O_3$ | — | 6.00E−03 | 10.0 | 880 | 1.5 | EB | Present |
| Fifth Layer | $La_xAl_yO_z$ | — | 6.00E−03 | 4.0 | 380 | 1.6 | EB | Present |
| Sixth Layer | $SiO_2 + Al_2O_3$ | — | 6.00E−03 | 10.0 | 750 | 1.3 | EB | Present |

In the film forming method of Table 8, a mixture of $SiO_2$ and $Al_2O_3$ is used as the low-refractive-index material, and $La_xAl_yO_z$ (x, y, and z are a numerical value of 1 to 10) is used as the high-refractive-index material. As described later, the oxygen permeability coefficient of the optical element including the improved film 5 formed by the film forming method of Table 8 is lower than that of the optical element oxide ($TiO_2$), lanthanum aluminate ($LaAlO_3$), a mixture of zirconium oxide ($ZrO_2$) and aluminum oxide ($Al_2O_3$), metal fluoride, and a mixture thereof.

Examples of the low-refractive-index material with which the use of the oxygen is not required as the ambient gas in the film forming process include silicon dioxide ($SiO_2$), metal fluoride, zeolite ($Na_2AlF_6$), chiolite ($Na_5Al_3F_{14}$), cryolite ($Na_3AlF_6$), dysprosium fluoride ($DyF_3$), thorium fluoride ($ThF_4$), a mixture of silicon dioxide ($SiO_2$) and metal oxide and a mixture thereof.

A deoxygenating treatment is previously performed to the raw material, because the titanium oxide and the tantalum oxide tend to be decomposed into the metal and the oxygen to make the film forming pressure unstable when a raw material is melt before the film forming. Therefore, it is necessary to introduce the oxygen during the film forming. For the aluminum oxide and the silicon dioxide, the deoxygenating treatment of the raw material is not required because a small amount of degassing is generated during the melting. Therefore, it is not necessary to introduce the oxygen during the film forming. For a material whose main component does not include the oxygen, it is not necessary to introduce the oxygen during the film forming.

Figure 17:
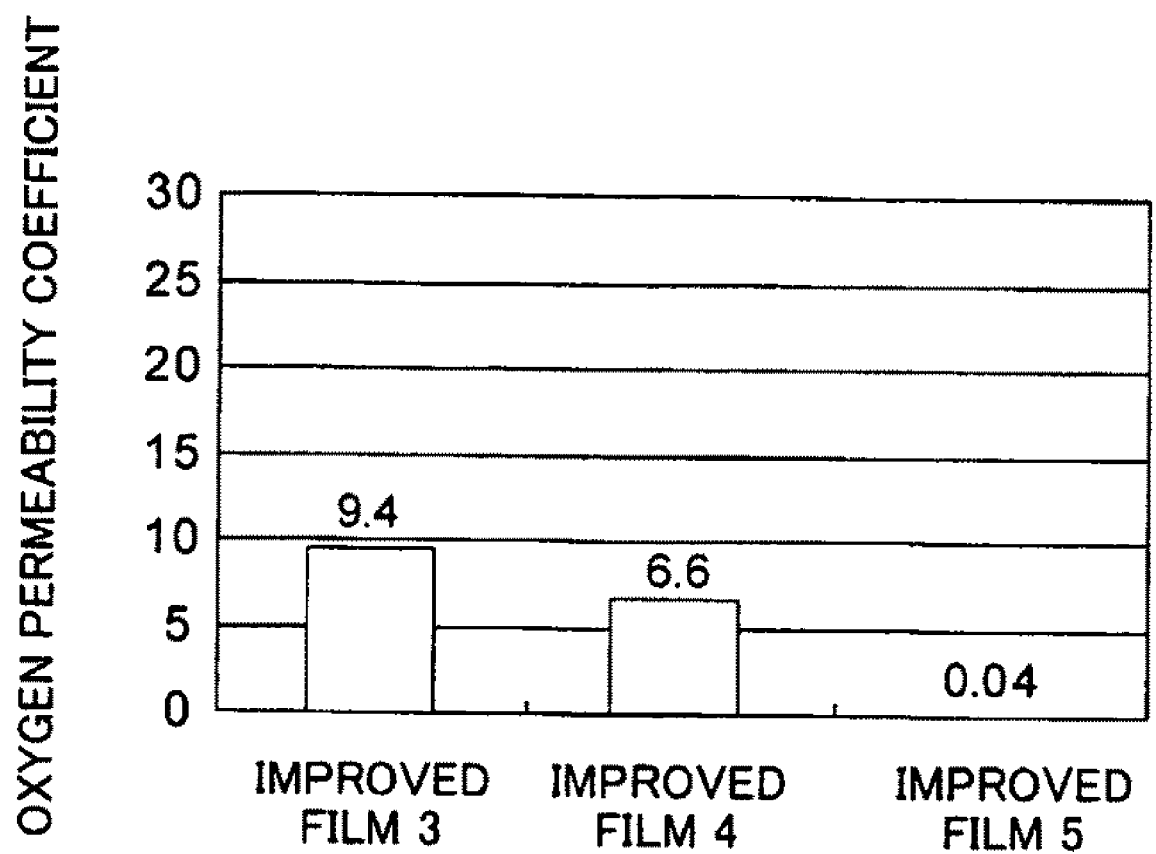
FIG. 17 illustrates an oxygen permeability coefficient of an optical element in which improved films 3 to 5 are formed on a conventional substrate.

FIG. 17 illustrates oxygen permeability coefficients of the optical elements in which the improved films 3 to 5 are formed on a conventional substrate. The optical element in which the improved film 3 is formed has the maximum oxygen permeability coefficient, and the optical element in which the improved film 5 is formed has the minimum oxygen permeability coefficient. The oxygen permeability coefficients of all the optical elements are lower than that of the optical element in which the improved film 2 of FIG. 6 is formed.

Figure 18:
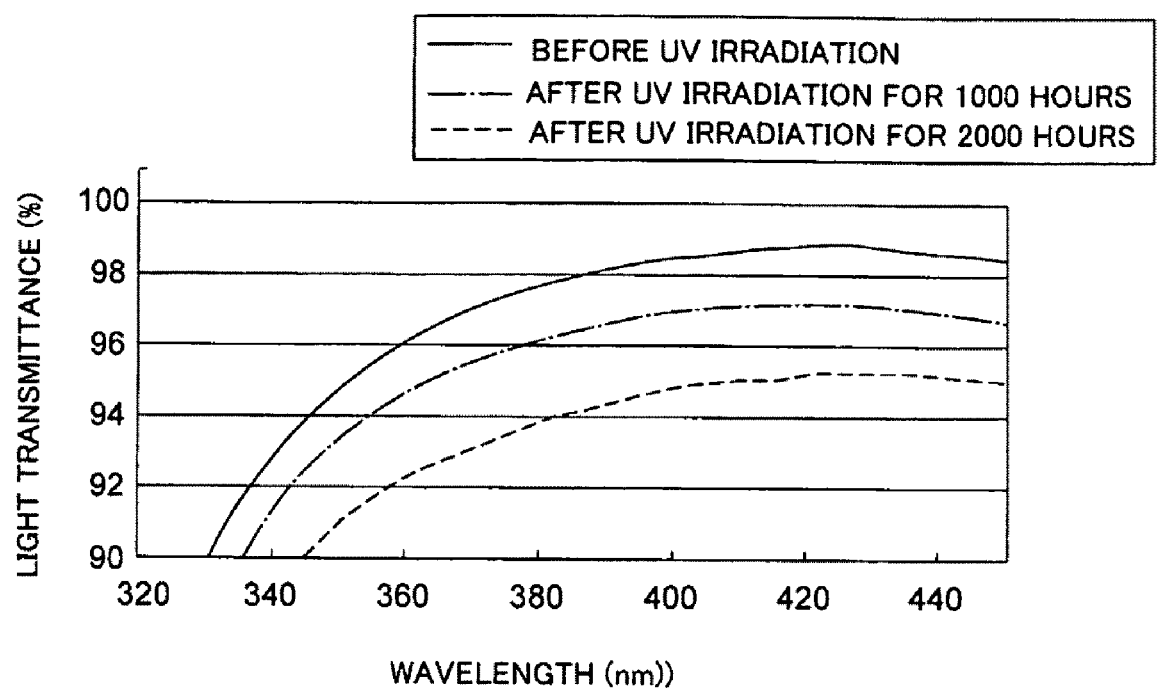
FIG. 18 illustrates a change in light transmittance of an optical element in which an improved film 2 is formed on the conventional substrate.

FIG. 18 illustrates a change in light transmittance of an optical element in which the improved film 2 is formed on the conventional substrate. A horizontal axis indicates wavelength, and a vertical axis indicates the light transmittance of the optical element. FIG. 18 illustrates data before the optical element is irradiated with an ultraviolet ray having the wavelength of 365 nm, data after the optical element is irradiated with the ultraviolet ray for 1000 hours, and data after the optical element is irradiated with the ultraviolet ray for 2000 hours.

Figure 19:
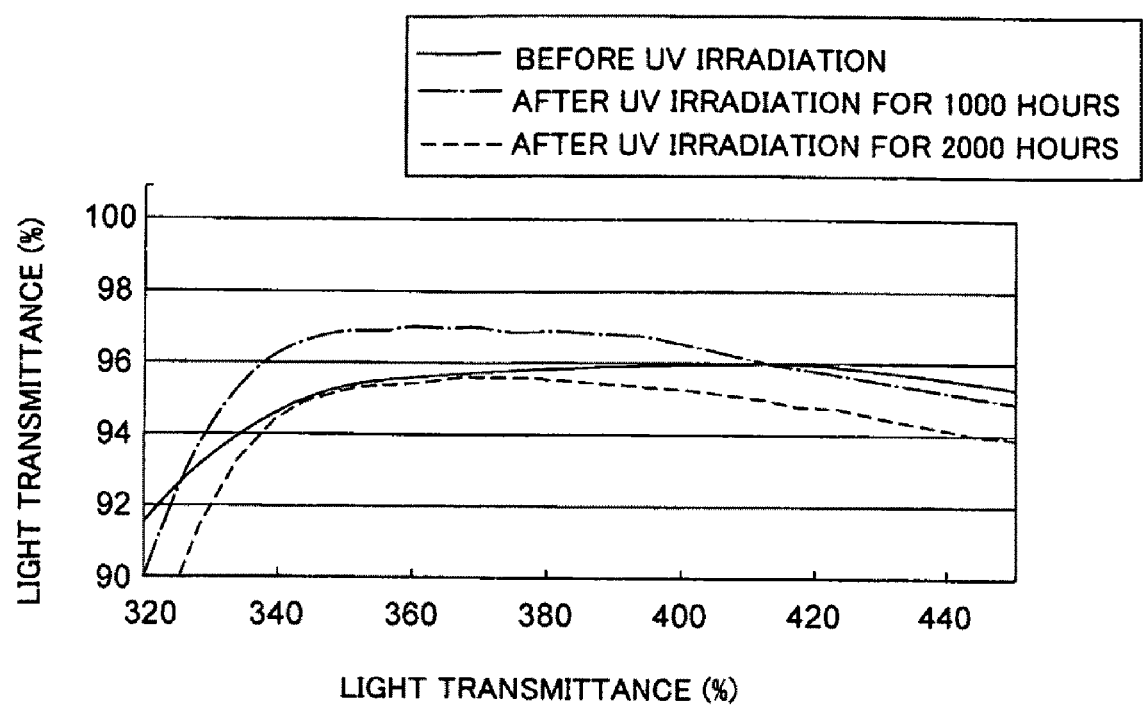
FIG. 19 illustrates a change in light transmittance of an optical element in which an improved film 4 is formed on the conventional substrate.

FIG. 19 illustrates a change in light transmittance of the optical element in which the improved film 4 is formed on the conventional substrate. The horizontal axis indicates wavelength, and the vertical axis indicates the light transmittance of the optical element. FIG. 19 illustrates data before the optical element is irradiated with an ultraviolet ray having the wavelength of 365 nm, data after the optical element is irradiated with the ultraviolet ray for 1000 hours, and data after the optical element is irradiated with the ultraviolet ray for 2000 hours. The light transmittance after UV irradiation for 1000 hours is increased for lights at wavelengths of 330 nm to 410 nm.

Figure 20:
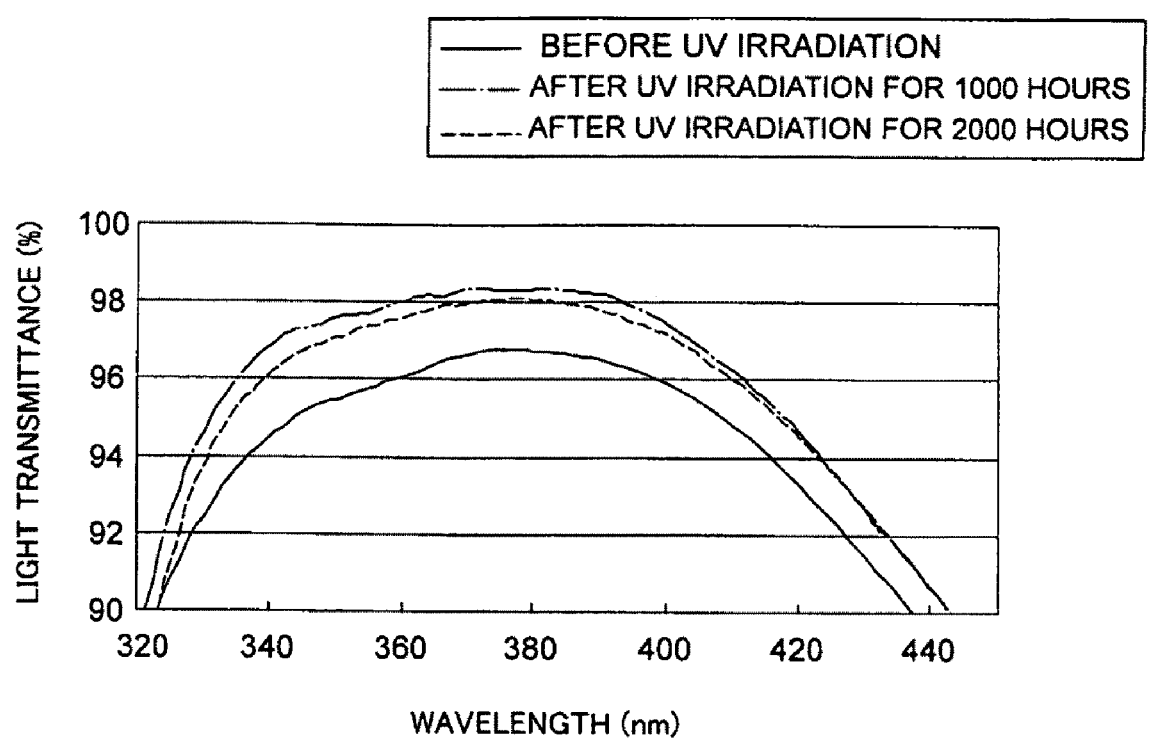
FIG. 20 illustrates a change in light transmittance of an optical element in which an improved film 5 is formed on the conventional substrate.

FIG. 20 illustrates a change in light transmittance of an optical element in which the improved film 5 is formed on the conventional substrate. The horizontal axis indicates wavelength, and the vertical axis indicates the light transmittance of the optical element. FIG. 20 illustrates data before the optical element is irradiated with an ultraviolet ray having the wavelength of 365 nm, data after the optical element is irradiated with the ultraviolet ray for 1000 hours, and data after the optical element is irradiated with the ultraviolet ray for 2000 hours. The light transmittance after UV irradiation for 1000 hours and the light transmittance after UV irradiation for 2000 hours are increased for lights at wavelengths of 330 nm to 440 nm.

In the optical elements whose data are illustrated in FIGS. 17 to 20, the improved films 2 to 5 are formed on the conventional substrate. The deterioration of the light transmittance of the optical element in which each of the improved films 2 to 5 is formed on a substrate molded in a nitrogen atmosphere is less than that of each of the light transmittances illustrated in FIGS. 18 to 20.

Examples of the high-refractive-index material having little absorption of light in the ultraviolet wavelength range shorter than 400 nm include zinc sulfide (ZnS), cadmium sulfide (CdS), tantalum oxide ($Ta_2O_5$), zirconium oxide ($ZrO_2$), niobium oxide ($Nb_2O_5$), cerium oxide ($CeO_2$), titanium oxide ($TiO_2$, TiO, $Ti_2O_3$, $Ti_3O_5$, and $Ti_4O_7$), antimony oxide ($Sb_2O_3$), a mixture of zirconium titanate ($ZrTiO_4$) and zirconium oxide ($ZrO_2$), lanthanum oxide ($La_2O_3$), bismuth oxide ($Bi_2O_3$), neodymium oxide ($Nd_2O_3$), lanthanum titanate ($La_2Ti_2O_7$), praseodymium titanate ($PrTiO_4$), a mixture of tantalum oxide ($Ta_2O_5$) and tantalum (Ta), a mixture of tantalum oxide ($Ta_2O_5$), zirconium oxide ($ZrO_2$), and yttrium oxide ($Y_2O_3$), a mixture of tantalum oxide ($Ta_2O_5$) and titanium oxide ($TiO_2$), a mixture of zirconium oxide ($ZrO_2$) and titanium oxide ($TiO_2$), lanthanum aluminate ($LaAlO_3$), aluminum oxide ($Al_2O_3$), samarium oxide ($Sm_2O_3$), tungsten oxide ($WO_3$), yttrium oxide ($Y_2O_3$), gadolinium oxide ($Gd_2O_3$), metal fluoride, praseodymium aluminate ($PrAl_2O_7$), thorium oxide ($ThO_2$), scandium oxide ($Sc_2O_3$), a mixture of zirconium oxide ($ZrO_2$) and aluminum oxide ($Al_2O_3$), and a mixture thereof.

Examples of the low-refractive-index material having little absorption of light in the ultraviolet wavelength range shorter than 400 nm include silicon dioxide ($SiO_2$), metal fluoride, zeolite ($Na_2AlF_6$), chiolite ($Na_5Al_3F_{14}$), cryolite ($Na_3AlF_6$), dysprosium fluoride ($DyF_3$), thorium fluoride ($ThF_4$), a mixture of silicon dioxide ($SiO_2$) and metal oxide, and a mixture thereof.

An attenuation coefficient of the light having the wavelength of 400 nm of the above-described materials having the little absorption of the light in the ultraviolet wavelength range is equal to or lower than $1 \times 10^{-2}$.

The attenuation coefficient is k in the following equation:

$$I = I_0 e^{-\alpha z}$$

$$\alpha = \frac{4\pi k}{\lambda}$$

where,
I: light intensity in material
$I_0$: initial light intensity
z: penetration depth into material
α: absorption coefficient
λ: wavelength of light The improved films 1 to 5 are formed by the ion plating method. However, in other film forming methods, the manufacturing conditions can be changed according to the method of FIG. 12 to produce the optical element having a small oxygen permeability coefficient.

Figure 21:
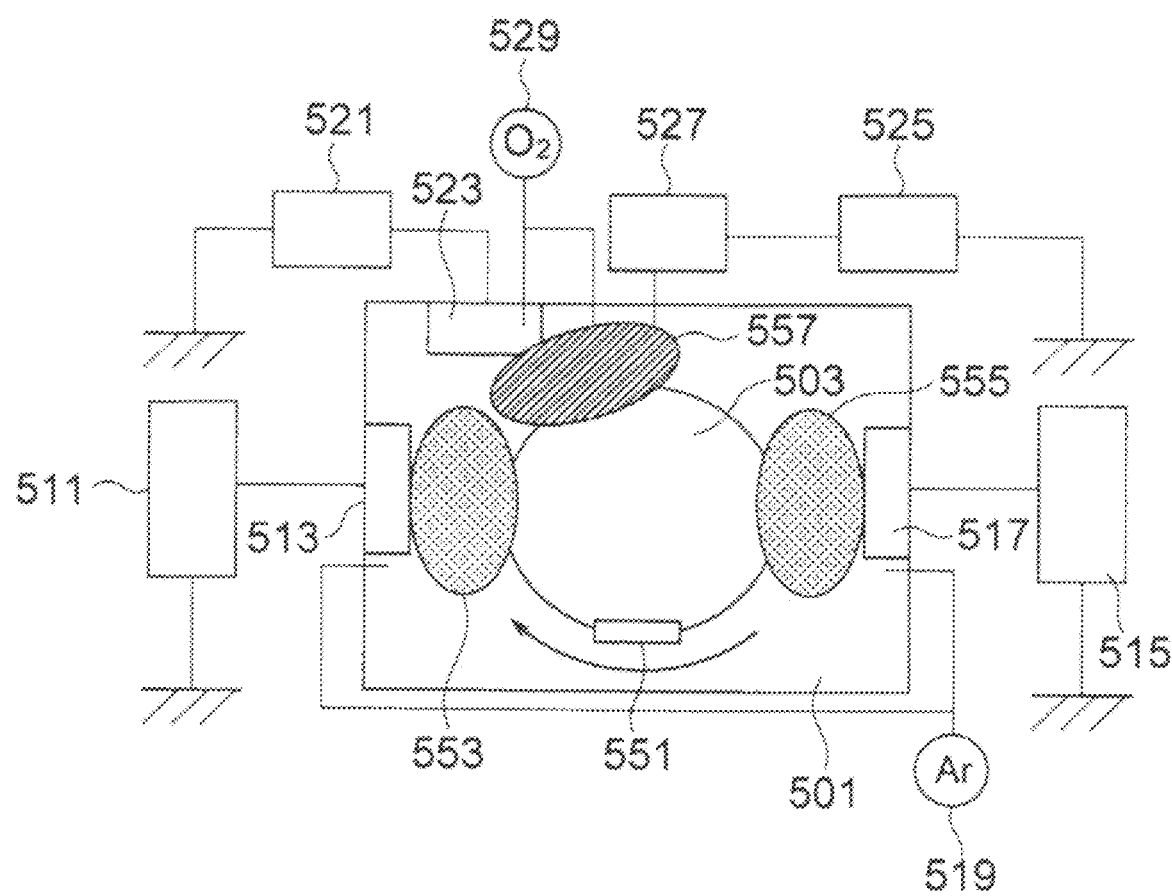
FIG. 21 illustrates a configuration of a sputtering apparatus in film forming is performed by sputtering.

FIG. 21 illustrates a configuration of a sputtering apparatus in which film forming is performed by sputtering. A low-refractive-index material metal target 513, a high-refractive-index material metal target 517, an ion gun 523 that is of an oxidation source, and a microwave electron cyclotron resonance device (microwave ECR) 527 are provided in a film forming chamber 501. The microwave ECR 527 includes a matching box 525. For example, a voltage at the ion gun is set in the range of 0 kV to 3 kV, and the output of ECR is set in the range of 0 W to 1500 W.

A substrate 551 is disposed in a drum 503. When the drum 503 is rotated, the substrate 551 passes through positions facing the low-refractive-index material metal target 513, the high-refractive-index material metal target 517, and the microwave ECR 527.

First the method for forming the low-refractive-index material film will be described. A voltage is applied to the low-refractive-index material metal target 513 from a cathode power supply 511, and the argon gas is supplied from an argon gas source 519 to form a low-refractive-index material metal film forming region 553. A high-frequency voltage is supplied to the microwave ECR 527 from a microwave power supply, an ion beam is irradiated from an ion gun 523, and the oxygen gas is supplied from the oxygen gas source to form a metal film oxidation region 557. The metal film is formed when the drum 503 is rotated to cause the substrate 551 to pass through the low-refractive-index material metal film forming region 553. Then the metal film is oxidized when the substrate 551 passes through the metal film oxidation region 557. The film forming is continued until the desired film thickness is obtained.

After the low-refractive-index material film became the desired film thickness, a voltage is applied to the high-refractive-index material metal target 517 from a cathode power supply 515, and the argon gas is supplied from the argon gas source 519 to form a high-refractive-index material metal film forming region 555 which will cover the substrate 551. The high-frequency voltage is supplied to the microwave ECR 527 from the microwave power supply, the ion beam is irradiated from the ion gun 523, and the oxygen gas is supplied from the oxygen gas source to form the metal film oxidation region 557. The metal film is formed when the drum 503 is rotated to cause the substrate 551 to pass through the high-refractive-index material metal film forming region 555. Then the metal film is oxidized when the substrate 551 passes through the metal film oxidation region 557. The film forming is continued until the desired film thickness is obtained.

Thus, the metal oxide film made of the low-refractive-index material and the metal oxide film made of the high-refractive-index material are sequentially formed.

Figure 22:
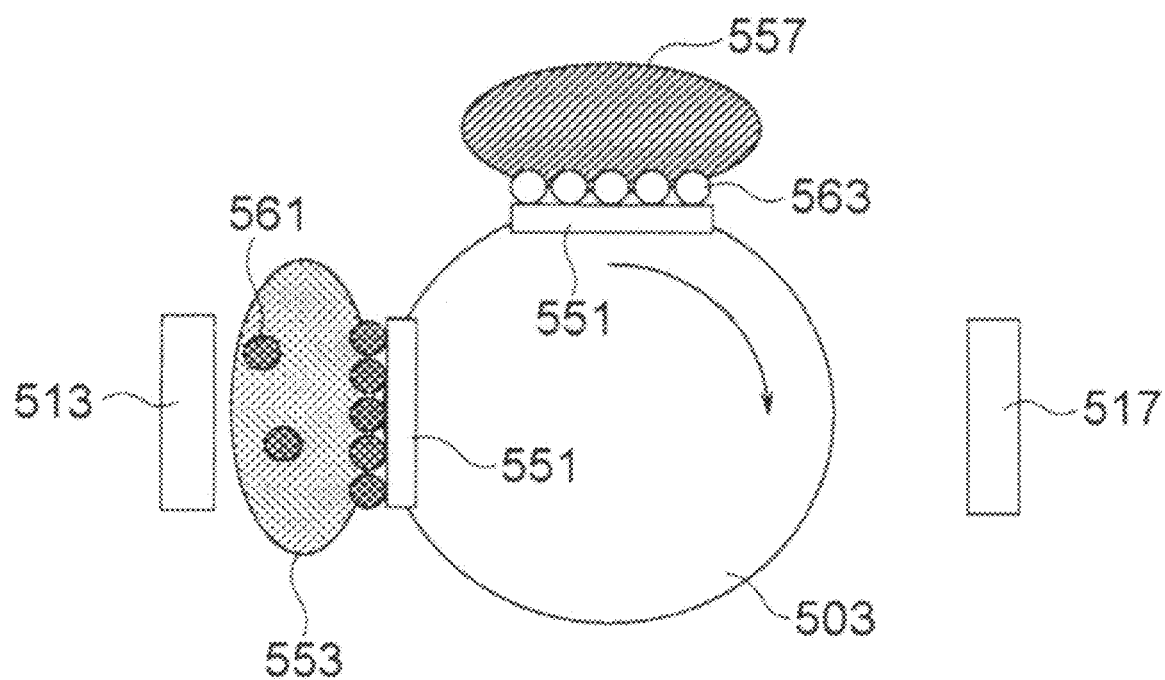
FIG. 22 is a view for explaining a principle of the film forming performed by the sputtering.

FIG. 22 is a view for explaining a principle of the film forming performed by the sputtering. In the low-refractive-index material metal film forming region 553 where the argon plasma is produced, sputtered metal particles 561 adhere to the substrate 551. In the metal film oxidation region 557 where the oxygen plasma is produced, the metal film is oxidized on the substrate 551 to form a metal oxide film 563.

An example of the method for forming the film by the sputtering is shown below.

TABLE 9

| | Film Configuration | Output of Cathode Power Supply [kW] | Cathode Ar Flow Rate [sccm] | Output of Oxidation Source 1 [W] | O$_2$ flow Rate of Oxidation Source 1 [sccm] | Output of Oxidation Source 2 [kW] | O$_2$ flow Rate of Oxidation Source 2 [sccm] | Film Thickness (Rough Indication) [Å] | Deposition Time (Rough Indication) [min] |
|---|---|---|---|---|---|---|---|---|---|
| First Layer | Ta$_2$O$_5$ | 6.6 | 200 | 1400 | 565 | 0.9 | 55 | 120 | 0.5 |
| Second Layer | SiO$_2$ | 7.7 | 100 | 1400 | 400 | 2.8 | 35 | 230 | 1.0 |
| Third Layer | Ta$_2$O$_5$ | 6.6 | 200 | 1400 | 565 | 0.9 | 55 | 840 | 3.5 |
| Fourth Layer | SiO$_2$ | 7.7 | 100 | 1400 | 400 | 2.8 | 35 | 630 | 2.6 |

In Table 9, the output of the oxidation source 1 indicates an output of the microwave ECR 527, and the output of the oxidation source 2 indicates an output of the ion gun power supply 521 of the ion gun 523. The oxygen flow rate of the oxidation source 1 and the oxygen flow rate of the oxidation source 2 indicate oxygen flow rates supplied to the matching box 527 and the ion gun 523, respectively.

Figure 23:
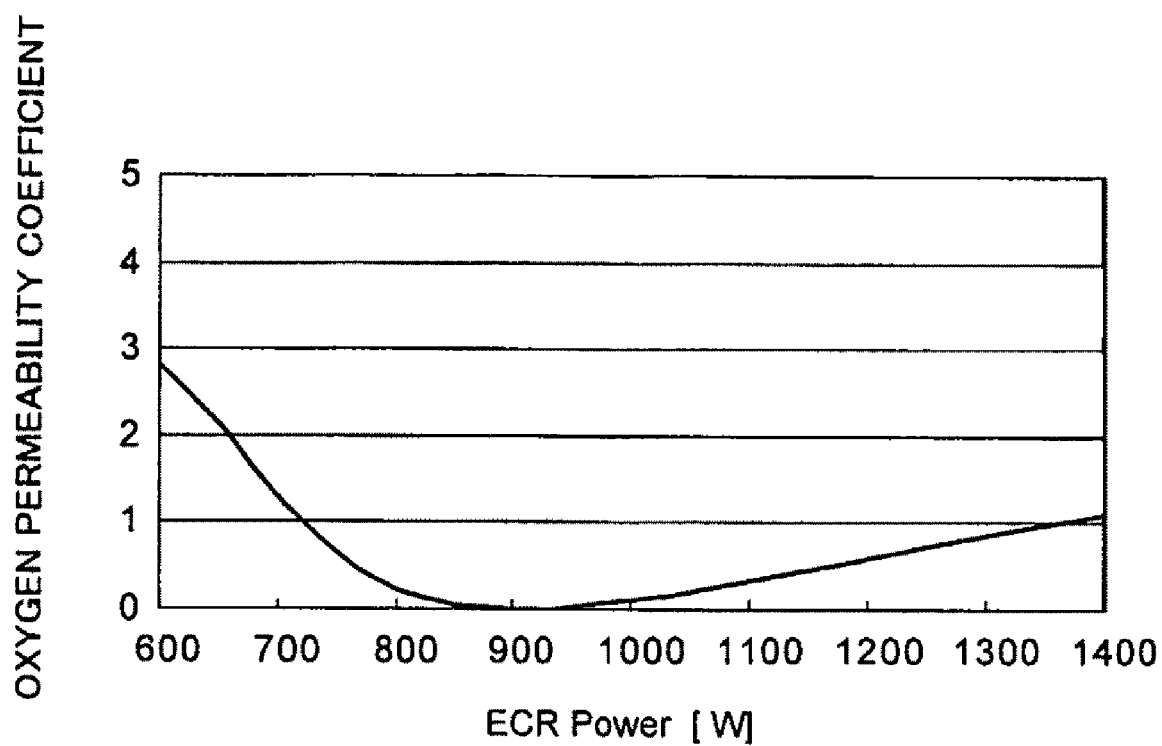
FIG. 23 illustrates a change in oxygen permeability coefficient of an optical element when an output of ECR of the sputtering apparatus is changed in forming films.

FIG. 23 illustrates a change in oxygen permeability coefficient of the optical element when the output of ECR of the sputtering apparatus is changed during a period that the multi-layered film is formed on the substrate made of thermoplastic transparent cycloolefin polymer.

Figure 25:
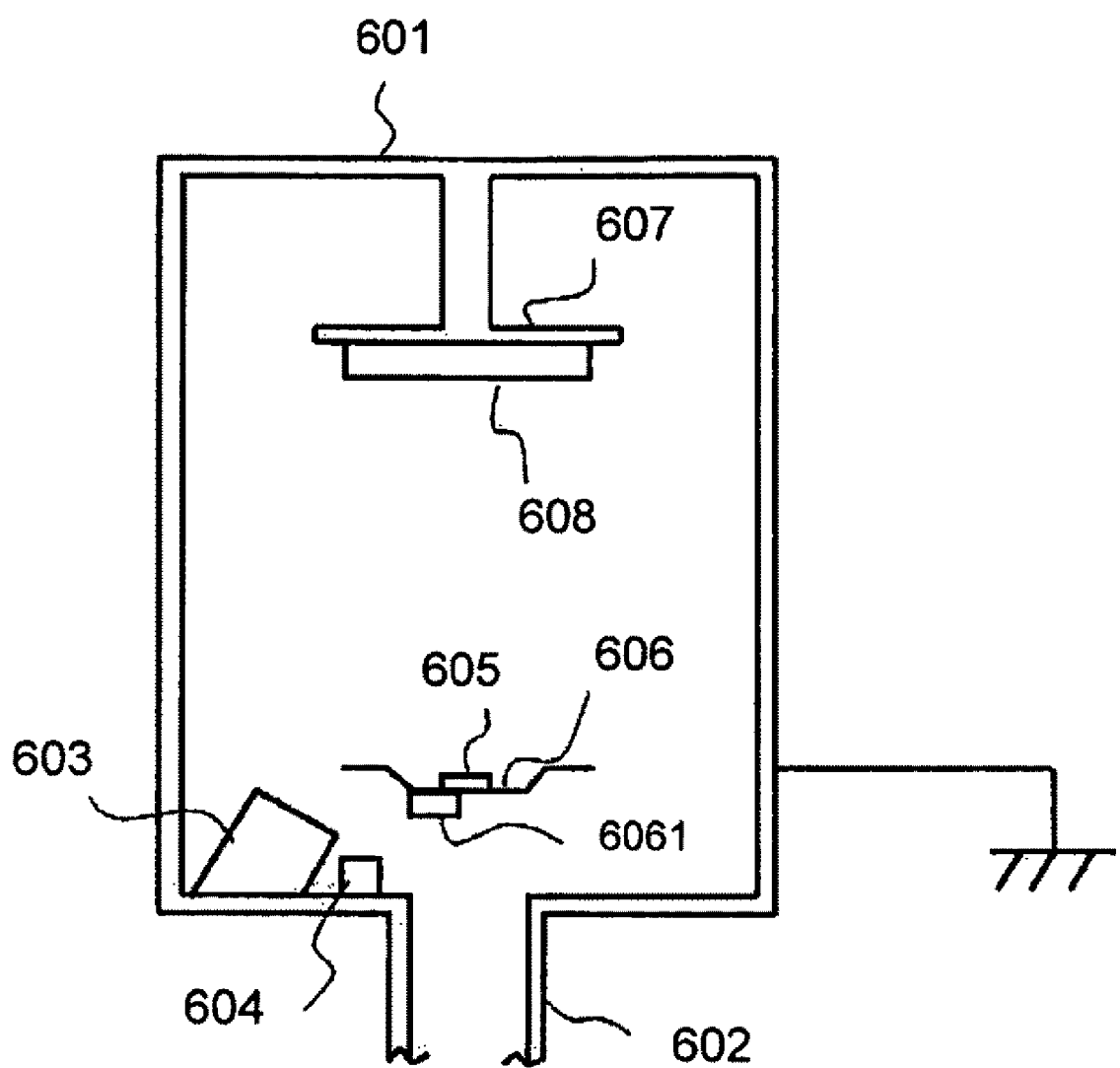
FIG. 25 illustrates a configuration of an ion beam assist deposition apparatus in which film forming is performed by an ion beam assist deposition method.

FIG. 25 illustrates a configuration of an ion beam assist deposition apparatus in which the film forming is performed by an ion beam assist deposition method. In a vacuum chamber 601 of the ion beam assist deposition apparatus, a base holder 607 that holds a base 608, an ion gun 603 that supplies the gas to the base 608 while the gas is ionized, a neutralizer 604 that emits electrons in order to neutralize charges, and a resistive heating board 606 to evaporate a evaporation material 605 that gives the thin film to the base 608 are provided. For example, an anode voltage of the ion gun 603 is set at 50V.

An electron gun 6061 for electron beam heating is disposed below a crucible including the resistive heating board 606.

An example of the method for forming the film by the ion beam assist deposition is shown below.

TABLE 10

|  | Film Configuration | Introduction Gas Species | Introduction Gas Flow Rate [sccm] | Ion Gun Anode Voltage [V] | Film Forming Rate Setting | Film Thickness (Rough Indication) | Deposition Time [min] (Rough Indication) | Evaporation Source |
|---|---|---|---|---|---|---|---|---|
| First Layer | Titanium oxide based material | $O_2$ | 20 | 45 | 2.5 Å/s | 100 Å | 0.7 | EB |
| Second Layer | $SiO_2$ | Ar | 7 | 40 | 15 Å/s | 180 Å | 0.2 | EB |
| Third Layer | Titanium oxide based material | $O_2$ | 20 | 45 | 2.5 Å/s | 680 Å | 4.5 | EB |
| Fourth Layer | $SiO_2$ | Ar | 7 | 40 | 15 Å/s | 650 Å | 0.7 | EB |

In Table 10, $Ti_3O_5$ is used as the titanium oxide based material by way of example. In Table 10, the letter EB designates the electron beam heating.

During the film forming, the ambient gas such as the oxygen and the argon is introduced into the vacuum chamber 601 through a valve (not shown). The gas in the vacuum chamber 601 is evacuated through an exhaust port 602.

A principle of the ion beam assist deposition method will be described below. The ion gun 603 ionizes the introduced ambient gas, and the ionized gas is supplied to the base 608. The dense film is deposited, because the ionized gas supplied to the substrate gives energy when the evaporated material is deposited on the base 608.

In the ion beam assist deposition method, as with the ion plating method and the sputtering method, the oxygen permeability coefficient can be lowered by changing one of the electric power (output of ion gun 603) supplied to the ion gun 603, the ambient gas pressure in forming the layer made of the low-refractive-index material, and the ambient gas pressure in forming the layer made of the high-refractive-index material.

The invention is based on first knowledge that the conditions for producing the optical element including the multi-layered film have the large influence on the oxygen permeability coefficient of the optical element and second knowledge that the significant correlation exists between the oxygen permeability coefficient of the optical element including the multi-layered film and the amount of change in light transmittance for the light in the wavelength range of 300 nm to 450 nm (that is, when the oxygen permeability coefficient is equal to or lower than a predetermined value, the amount of change in light transmittance of the optical element including the multi-layered film is suppressed to a small value for the light in the wavelength range of 300 nm to 450 nm).

According to the invention, the conditions for producing the optical element having the small amount of change in light transmittance can be determined by measuring the oxygen permeability coefficient of the optical element and determining the producing conditions such that the oxygen permeability coefficient becomes equal to or lower than the predetermined value.

As is clear from the first knowledge and the second knowledge, the optical element producing conditions have the large influence on the amount of change in light transmittance of the optical element. Therefore, the conditions for producing the optical element having the small amount of change in light transmittance for the light in the wavelength range of 300 nm to 450 nm can also be determined by measuring the amount of change in light transmittance of the optical element.

The optical element having the small amount of change in light transmittance for the light in the wavelength range of 300 nm to 450 nm can be produced by the producing method according to the invention.

The optical element of the invention acts as an antireflection optical element, an optical filter, a beam splitter, and the like.

What is claimed is:

1. A method for producing an optical element having a multi-layered film in which a layer made of a low-refractive-index material and a layer made of a high-refractive-index material are alternately formed on a plastic substrate, the optical element being used for light in a wavelength range of 300 nm to 450 nm, the optical element producing method comprising:

forming alternately the layer made of the low-refractive-index material and the layer made of the high-refractive-index material on the plastic substrate to produce the optical element while plasma or ionized gas is generated by a generation source in forming at least the layer made of the high-refractive-index material under predetermined producing conditions, wherein the predetermined producing conditions are determined such that the oxygen permeability coefficient of the produced optical element is equal to or less than 30 cm3×mm/(m2×24 hr×atm) such that transmittance of the light in a wavelength range of 300 nm to 450 nm of the optical element is substantially maintained after being irradiated with the light for 1000 hours.

2. The optical element producing method according to claim 1, wherein an ion plating method is adopted, and the optical element producing method includes the steps of:

forming alternately the layer made of the low-refractive-index material and the layer made of the high-refractive-index material on the plastic substrate to produce the optical element while the plasma is generated by a high-frequency power supply in forming at least the layer made of the high-refractive-index material under the predetermined producing conditions;

measuring the oxygen permeability coefficient of the produced optical element; and changing one of an output of the high-frequency power supply, the ambient gas pressure in forming the layer made of the low-refractive-index material, and the ambient gas pressure in forming the layer made of the high-refractive-index material among the predetermined producing conditions when the oxygen permeability coefficient of the produced optical element is more than 30 cm3×mm/(m2×24 hr×atm).

3. The optical element producing method according to claim 2, wherein oxygen is not used as ambient gas in forming the layer made of the low-refractive-index material.

4. The optical element producing method according to claim 3, wherein inert gas is used as the ambient gas in forming the layer made of the low-refractive-index material.

5. The optical element producing method according to claim 2, wherein oxygen is not used as ambient gas in forming the layer made of the high-refractive-index material.

6. The optical element producing method according to claim 5, wherein inert gas is used as the ambient gas in forming the layer made of the high-refractive-index material.

7. The optical element producing method according to claim 2, wherein the plasma is generated in forming the layer made of the high-refractive-index material.

8. The optical element producing method according to claim 1, wherein a sputtering method is adopted, and
the optical element producing method includes the steps of:
forming alternately the layer made of the low-refractive-index material and the layer made of the high-refractive-index material on the plastic substrate to produce the optical element while oxygen is supplied to generate oxygen plasma by an output of an oxidation source in a oxidation region oxygen;
measuring the oxygen permeability coefficient of the produced optical element; and
changing one of an output of the oxidation source when the oxygen permeability coefficient of the produced optical element is more than 30 cm3×mm/(m2×24 hr×atm).

9. The optical element producing method according to claim 1, wherein an ion beam assist deposition method is adopted, and
the optical element producing method includes the steps of:
forming alternately the layer made of the low-refractive-index material and the layer made of the high-refractive-index material to produce the optical element while an ion gun ionizes ambient gas to supply ionized gas onto the plastic substrate under the predetermined producing conditions;
measuring the oxygen permeability coefficient of the produced optical element; and
changing one of an output of the ion gun, the ambient gas pressure in forming the layer made of the low-refractive-index material, and the ambient gas pressure in forming the layer made of the high-refractive-index material among the predetermined producing conditions when the oxygen permeability coefficient of the produced optical element is more than 30 cm3×mm/(m2×24 hr×atm).

* * * * *